(12) United States Patent
Jackson et al.

(10) Patent No.: US 10,735,803 B2
(45) Date of Patent: Aug. 4, 2020

(54) PLAYBACK DEVICE SETUP

(71) Applicant: Sonos, Inc., Santa Barbara, CA (US)

(72) Inventors: Richard Jackson, Boston, MA (US); Andrew Lindley, Santa Barbara, CA (US)

(73) Assignee: Sonos, Inc., Santa Barbara, CA (US)

(*) Notice: Subject to any disclaimer, the term of this patent is extended or adjusted under 35 U.S.C. 154(b) by 28 days.

(21) Appl. No.: 16/000,837

(22) Filed: Jun. 5, 2018

(65) Prior Publication Data

US 2019/0373313 A1 Dec. 5, 2019

(51) Int. Cl.
*H04N 21/436* (2011.01)
*G06F 3/0484* (2013.01)
*G06F 3/16* (2006.01)
*H04N 21/43* (2011.01)
*H04N 21/442* (2011.01)
*H04L 12/28* (2006.01)

(52) U.S. Cl.
CPC ... *H04N 21/43615* (2013.01); *G06F 3/04847* (2013.01); *G06F 3/167* (2013.01); *H04N 21/4307* (2013.01); *H04N 21/44227* (2013.01); *H04L 2012/2841* (2013.01); *H04L 2012/2849* (2013.01)

(58) Field of Classification Search
None
See application file for complete search history.

(56) References Cited

U.S. PATENT DOCUMENTS

| | | | |
|---|---|---|---|
| 5,440,644 A | 8/1995 | Farinelli et al. | |
| 5,761,320 A | 6/1998 | Farinelli et al. | |
| 5,923,902 A | 7/1999 | Inagaki | |
| 6,032,202 A | 2/2000 | Lea et al. | |
| 6,256,554 B1 | 7/2001 | Dilorenzo | |
| 6,404,811 B1 | 6/2002 | Cvetko et al. | |
| 6,469,633 B1 | 10/2002 | Wachter | |
| 6,522,886 B1 | 2/2003 | Youngs et al. | |

(Continued)

FOREIGN PATENT DOCUMENTS

| | | |
|---|---|---|
| EP | 1389853 A1 | 2/2004 |
| WO | 200153994 | 7/2001 |
| WO | 2003093950 A2 | 11/2003 |

OTHER PUBLICATIONS

AudioTron Quick Start Guide, Version 1.0, Mar. 2001, 24 pages.

(Continued)

*Primary Examiner* — Scott B Christensen

(74) *Attorney, Agent, or Firm* — McDonnell Boehnen Hulbert & Berghoff LLP

(57) ABSTRACT

Embodiments disclosed herein address technical challenges arising when configuring a playback device and a display device to interoperate with each other in an entertainment system. Some embodiments include a playback device (i) receiving data from a display device connected to the playback device, (ii) sending a request for configuration instructions to a cloud computing system, wherein the request comprises the data received from the display device, and (iii) in response to sending the data received from the display device to the cloud computing system, receiving configuration instructions from the cloud computing system, wherein the configuration instructions are associated with the display device connected to the playback device.

20 Claims, 18 Drawing Sheets

(56) References Cited

U.S. PATENT DOCUMENTS

| | | | |
|---|---|---|---|
| 6,611,537 | B1 | 8/2003 | Edens et al. |
| 6,631,410 | B1 | 10/2003 | Kowalski et al. |
| 6,757,517 | B2 | 6/2004 | Chang |
| 6,778,869 | B2 | 8/2004 | Champion |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,391,791 | B2 | 6/2008 | Balassanian et al. |
| 7,483,538 | B2 | 1/2009 | McCarty et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington et al. |
| 8,483,853 | B1 | 7/2013 | Lambourne |
| 8,942,252 | B2 | 1/2015 | Balassanian et al. |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0157951 | A1 | 8/2003 | Hasty |
| 2004/0024478 | A1 | 2/2004 | Hans et al. |
| 2007/0142944 | A1 | 6/2007 | Goldberg et al. |
| 2012/0327250 | A1* | 12/2012 | Zhang .............. G09G 5/006 348/180 |
| 2013/0160050 | A1* | 6/2013 | Halgas, Jr. ....... H04N 21/43615 725/34 |
| 2014/0012950 | A1* | 1/2014 | Doucette ............ G06F 15/173 709/218 |
| 2017/0288895 | A1* | 10/2017 | Marino ............. G06F 13/4022 |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

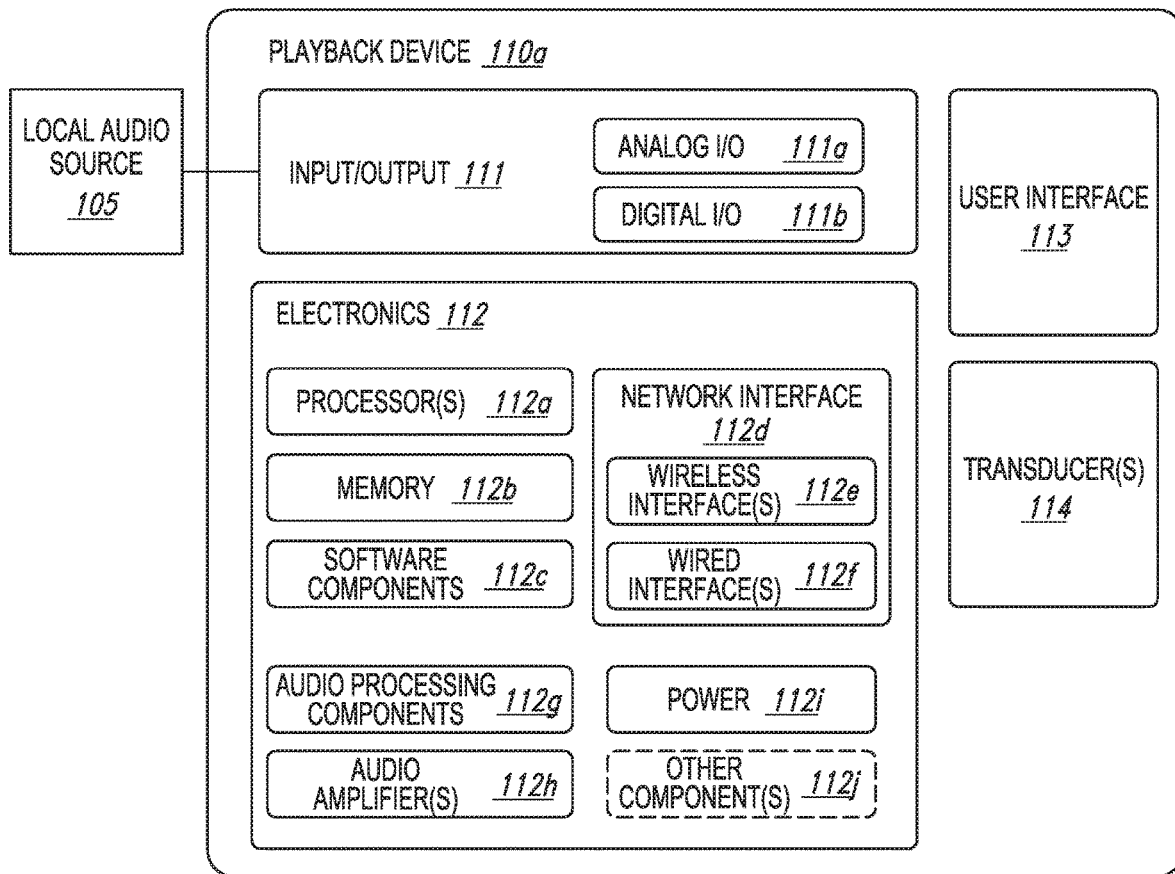
*Fig. 1C*
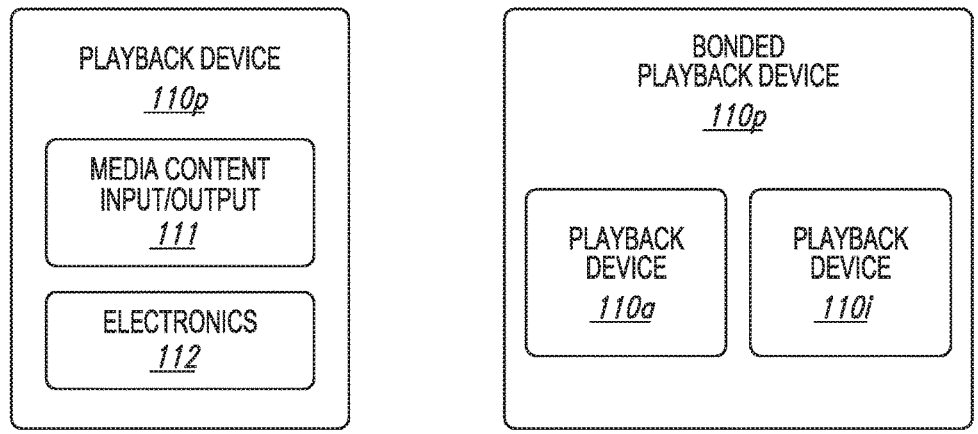
*Fig. 1D*  *Fig. 1E*

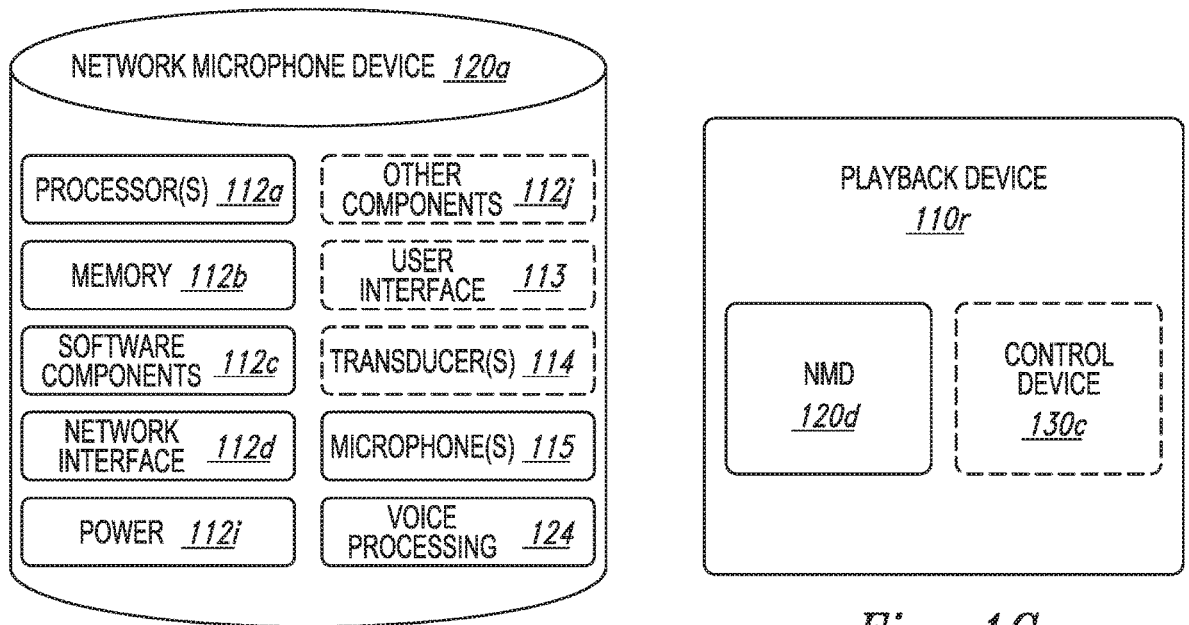
Fig. 1F
Fig. 1G
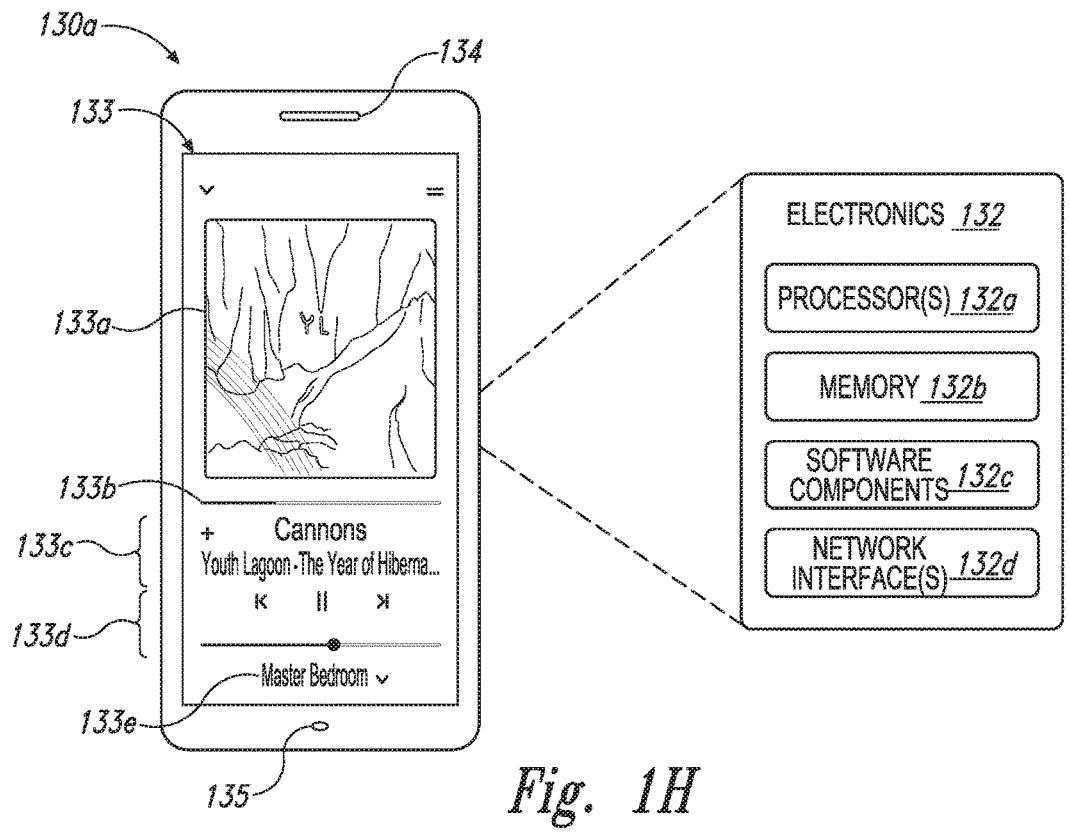
Fig. 1H

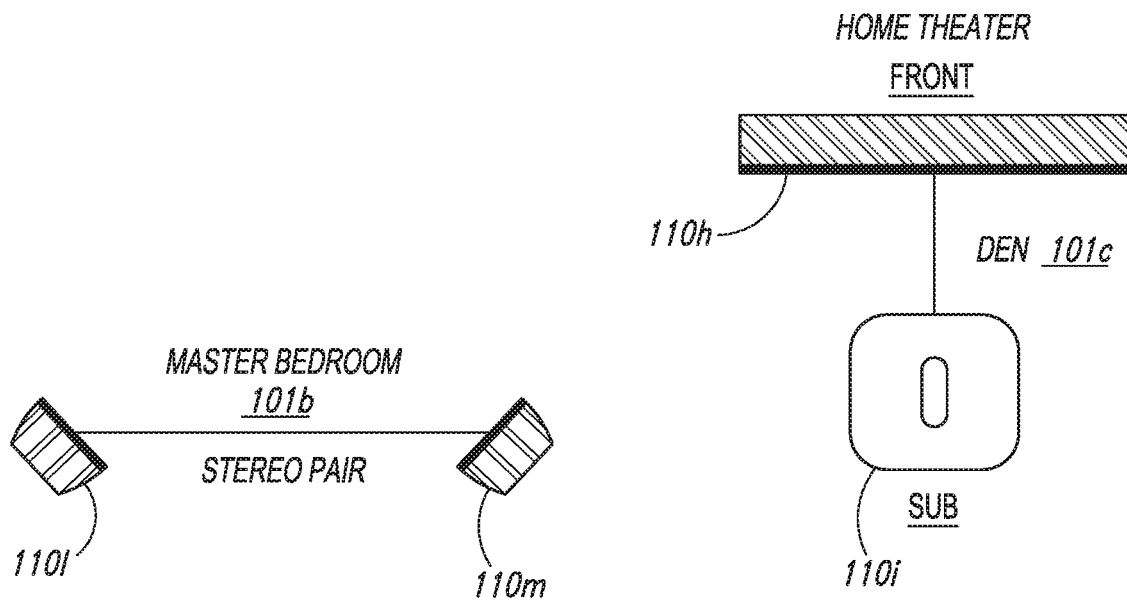
Fig. 1I
Fig. 1J
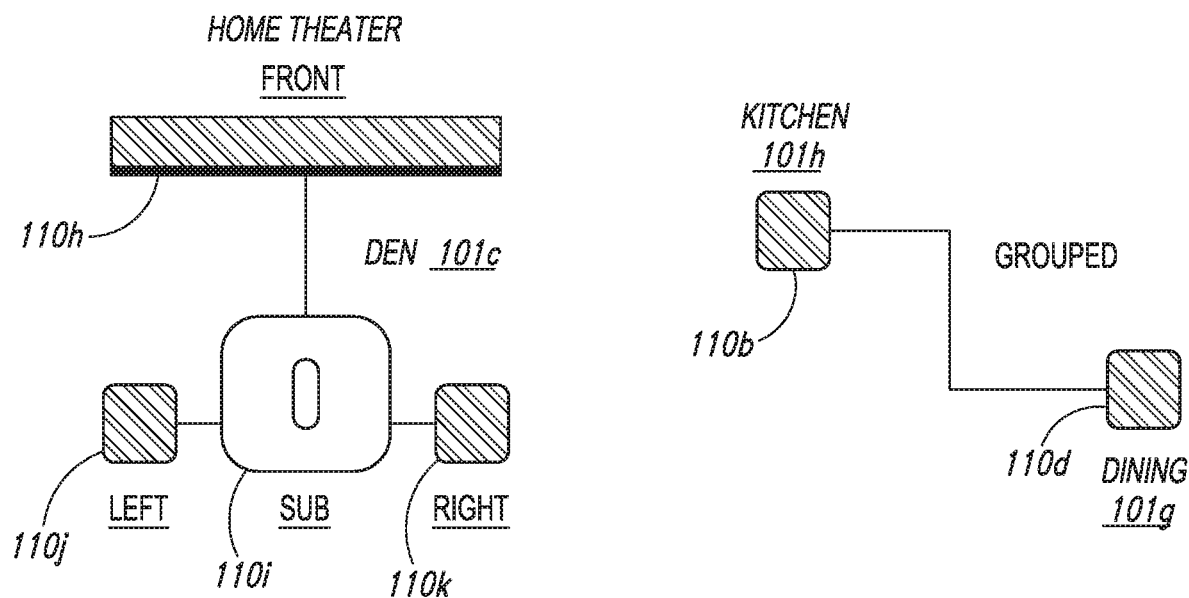
Fig. 1K
Fig. 1L

US 10,735,803 B2

PLAYBACK DEVICE SETUP

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIG. 1C is a block diagram of a playback device.

FIG. 1D is a block diagram of a playback device.

FIG. 1E is a block diagram of a network microphone device.

FIG. 1F is a block diagram of a network microphone device.

FIG. 1G is a block diagram of a playback device.

FIG. 1H is a partially schematic diagram of a control device.

FIGS. 1-I through 1L are schematic diagrams of corresponding media playback system zones.

Figure 1A:
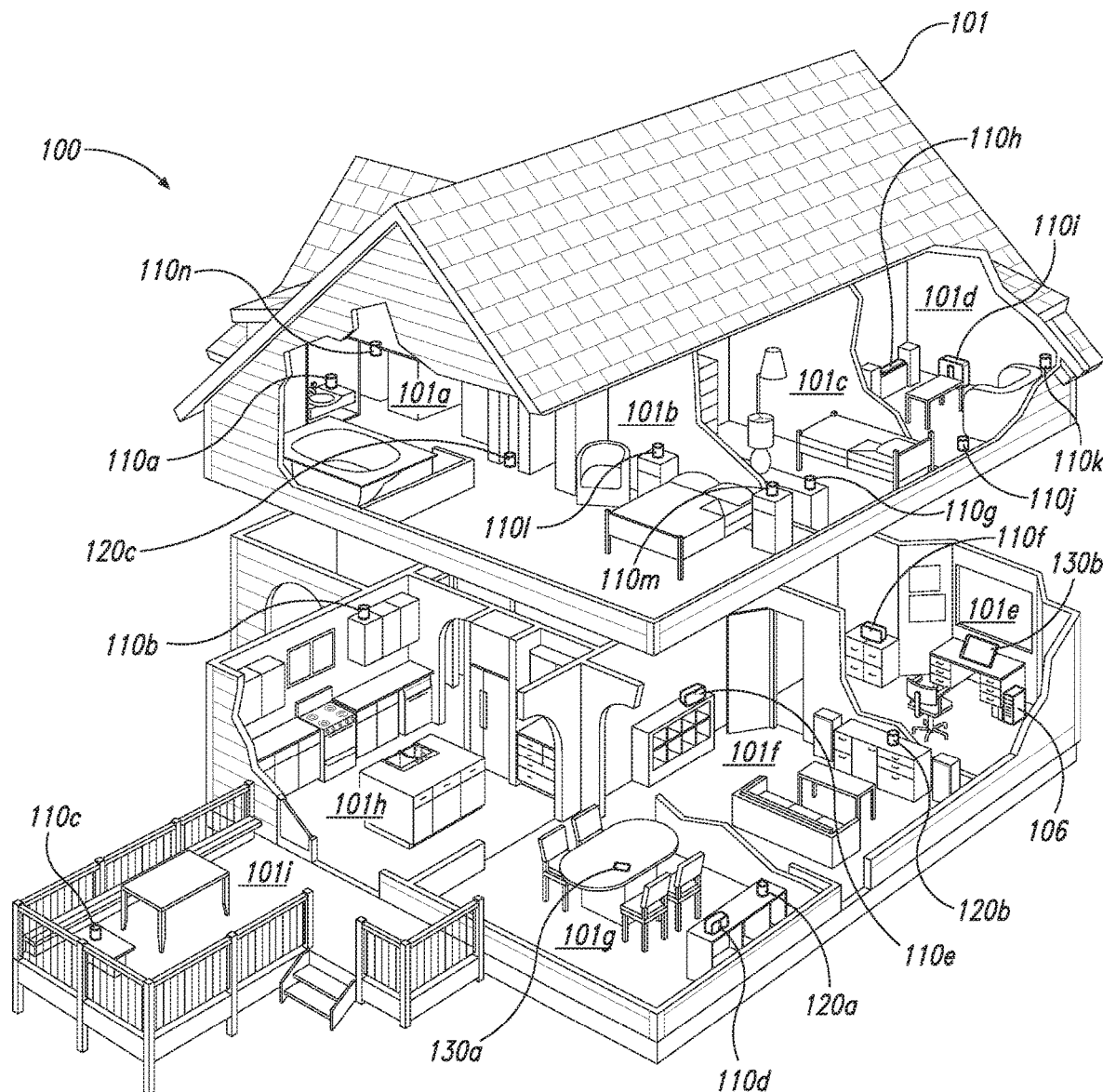
FIG. 1A is a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

In a typical audio/video entertainment system, a playback device (e.g., a soundbar) of a media playback system (e.g., a surround sound system) is connected to an audio source (e.g., a television, a "smart" television, Blu-ray player, media server, set-top box, video projector or other audio source). The audio source transmits audio content to the playback device for playback by the playback device individually or in combination with one or more additional playback devices of the media playback system. Typically, the audio content transmitted from the audio source to the playback device in such a configuration is audio content corresponding to video content that is displayed on a screen integrated with or at least connected to the audio source. In some scenarios, when the audio content corresponds to video content that is displayed on a screen integrated with or at least connected to the audio source, the playback device (individually or in combination with one or more additional playback devices of the media playback system) plays the audio content received from the audio source at the same time or at least substantially the same time that the screen associated with the audio source displays the corresponding video content. In some scenarios, playback of the audio content is synchronized (or at least substantially synchronized) with playback of the corresponding video content.

In many cases, the playback devices(s) and the audio source(s) of the audio/video entertainment system are from different manufacturers, and as a result, the devices support different (and often incompatible or perhaps partially compatible) audio format(s) and control/command capabilities, or even different versions (e.g., older or newer versions) of the same audio format(s) and control/command capabilities. Therefore, each device in the audio/video entertainment system typically needs to be specially configured for audio format(s) and control/command protocols to ensure interoperability of the audio source(s) and playback device(s) in the audio/video entertainment system.

However, because of the multiple different configuration options available on the many different types and brands of audio sources and playback devices available in the market, technical challenges arise when configuring an audio source device and a playback device to interoperate with each other to pass audio content and/or control data between each other in a way that maximizes the capabilities of the audio source and playback device(s), or at least improves upon the base capabilities in a way that improves user enjoyment of the audio/video entertainment system.

At the most basic level, the audio source and the playback device should be configured so that the audio source can pass audio content to the playback device (or media playback system) in a format that is playable by the playback device (or media playback system).

Some audio source devices may be configurable to transmit audio content in one of multiple formats, such as single-channel monoaural, dual-channel stereo, virtual surround sound, multi-channel surround sound (e.g., 5.1, 7.1, 10.2, 11.1, or 22.2 surround sound, etc.), 3D/object-based surround sound, and/or other formats. Further, some audio source devices may be configurable to transmit audio content in multiple versions of a particular format, such as Dolby Digital Plus® and Dolby TrueHD®, both of which are 7.1-channel surround sound formats except that Dolby TrueHD® has higher audio resolution (i.e., higher bitrate/higher quality audio) that Dolby Digital Plus®.

Also, some playback devices (and media playback systems) are capable of playing back audio content in one or more different formats. For example, a basic playback device may be able to play audio content only in single-channel monoaural format. A more advanced playback device may be able to play audio content in two-channel (left, right) stereo format or a three-channel (left, right, center) format. Further, a media playback system comprising multiple playback devices may be able to play audio content in a 5.1 channel format (left front, right front, center, left rear, right rear, subwoofer) or even more advanced formats, e.g. 7.1, 10.2, 11.1, or 22.2 surround sound or other different and/or more advanced surround sound or audio playback formats.

Despite being configurable for advanced audio formats, many audio sources and playback devices typically have "default" settings that are workable without further configuration to make setup quick and easy. However, those default settings are typically the most basic configuration setting that is likely to be supported by the broadest range of other devices, e.g., basic single-channel monoaural or 2-channel stereo. This is because the audio source does not know the playback capabilities of the playback device(s) connected thereto, and the playback device(s) do not know the source format capabilities of the audio source connected thereto.

If the audio source and the playback device both support a more advanced format than basic monoaural or stereo, e.g., 5.1 or 7.1 surround sound, then it is preferable to configure both the audio source and the playback device for the most advanced format that each can support rather than the "default" format because the most advanced format provides a better overall user experience than the default (e.g., mono or stereo) format and enables the audio source and playback device(s) to be utilized at their fullest potential.

Similarly, it is further desirable to configure the audio source and/or the playback device to send and receive control/command information to each other if that sort of inter-device control functionality is available on one or both of the audio source and/or playback device. For example, some audio source devices are configurable to send control commands to the playback device and/or media playback system, such as commands to power on and power off the playback device(s), turn the volume of the playback device(s) up and down, mute the volume of the playback device(s), and perhaps other control commands. Also, some audio source devices are additionally configurable to receive control commands from the playback device and/or media playback system, such as commands to power on and power off the audio source device and/or a video screen integrated with or at least associated with the audio source device, and perhaps other control commands.

Additionally, it is also desirable to configure the audio source and/or the playback device to process and respond to control/command information received from a single infrared remote control if infrared remote control functionality is available on one or both of the audio source and/or playback device. For example, if the audio source is a television with a remote control, it is desirable to configure the playback device to receive/process control signaling and/or command messages/instructions according to the same infrared remote control instruction set as the audio source so that a user can power on/off, mute, and control the volume of the playback device (and perhaps perform additional control functions, too) using the audio source's remote control.

The embodiments disclosed and described herein address some of the particular technical challenges that arise when (i) configuring an individual media playback device and/or a media playback system comprising a plurality of media playback devices to interface with an audio source for audio format/playback and command/control interoperability and/or (ii) configuring an audio source to interface with an individual media playback device and/or media playback system comprising a plurality of media playback devices for audio format/playback and command/control interoperability.

For example, some embodiments are implemented in or as a playback device that includes (i) one or more processors, (ii) one or more network interfaces, and (iii) tangible, non-transitory computer-readable memory having instructions encoded therein, wherein the instructions, when executed by the one or more processors, cause the playback device to perform various functions. In some embodiments, the various functions performed by the playback device include receiving data from a display device connected to the playback device; sending a request for configuration instructions to a cloud computing system, wherein the request comprises the data received from the display device; and in response to sending the data received from the display device to the cloud computing system, receiving configuration instructions from the cloud computing system, wherein the configuration instructions are associated with the display device connected to the playback device.

Other embodiments are implemented in or as a cloud computing system that includes (i) one or more processors, (ii) one or more network interfaces, and (iii) tangible, non-transitory computer-readable memory having instructions encoded therein, wherein the instructions, when executed by the one or more processors, cause the playback device to perform various functions. In some embodiments, the various functions performed by the cloud computing system include storing a plurality of correlations between display device identification data and corresponding configuration instructions in the tangible, non-transitory computer-readable media; receiving a request for configuration instructions from a playback device, wherein the request comprises data that the playback device received from a display device; in response to receiving the request for configuration instructions from the playback device, determining whether the plurality of correlations includes configuration instructions corresponding to the data in the request; and in response to determining that the plurality of correlations includes configuration instructions corresponding to the data in the request, transmitting the configuration instructions corresponding to the data in the request to the playback device that sent the request.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, element 110a is first introduced and discussed with reference to FIG. 1A. Many of the details, dimensions, angles and other features shown in the Figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110a-n), one or more network microphone devices ("NMDs"), 120 (identified individually as NMDs 120a-c), and one or more control devices 130 (identified individually as control devices 130a and 130b).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the media playback system 100 is configured to play back audio from a first playback device (e.g., the playback device 100a) in synchrony with a second playback device (e.g., the playback device 100b). Interactions between the playback devices 110, NMDs 120, and/or control devices 130 of the media playback system 100 configured in accordance with the various embodiments of the disclosure are described in greater detail below with respect to FIGS. 1B-1H.

In the illustrated embodiment of FIG. 1A, the environment 101 comprises a household having several rooms, spaces, and/or playback zones, including (clockwise from upper left) a master bathroom 101a, a master bedroom 101b, a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed to form, for example, the configuration shown in FIG. 1A. Each zone may be given a name according to a different room or space such as the office 101e, master bathroom 101a, master bedroom 101b, the second bedroom 101c, kitchen 101h, dining room 101g, living room 101f, and/or the balcony 101i. In some aspects, a single playback zone may include multiple rooms or spaces. In certain aspects, a single room or space may include multiple playback zones.

In the illustrated embodiment of FIG. 1A, the master bathroom 101a, the second bedroom 101c, the office 101e, the living room 101f, the dining room 101g, the kitchen 101h, and the outdoor patio 101i each include one playback device 110, and the master bedroom 101b and the den 101d include a plurality of playback devices 110. In the master bedroom 101b, the playback devices 110l and 110m may be configured, for example, to play back audio content in synchrony as individual ones of playback devices 110, as a bonded playback zone, as a consolidated playback device, and/or any combination thereof. Similarly, in the den 101d, the playback devices 110h-j can be configured, for instance, to play back audio content in synchrony as individual ones of playback devices 110, as one or more bonded playback devices, and/or as one or more consolidated playback devices. Additional details regarding bonded and consolidated playback devices are described below with respect to FIGS. 1B and 1E and 11-1M.

In some aspects, one or more of the playback zones in the environment 101 may each be playing different audio content. For instance, a user may be grilling on the patio 101i and listening to hip hop music being played by the playback device 110c while another user is preparing food in the kitchen 101h and listening to classical music played by the playback device 110b. In another example, a playback zone may play the same audio content in synchrony with another playback zone. For instance, the user may be in the office 101e listening to the playback device 110f playing back the same hip hop music being played back by playback device 110c on the patio 101i. In some aspects, the playback devices 110c and 110f play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
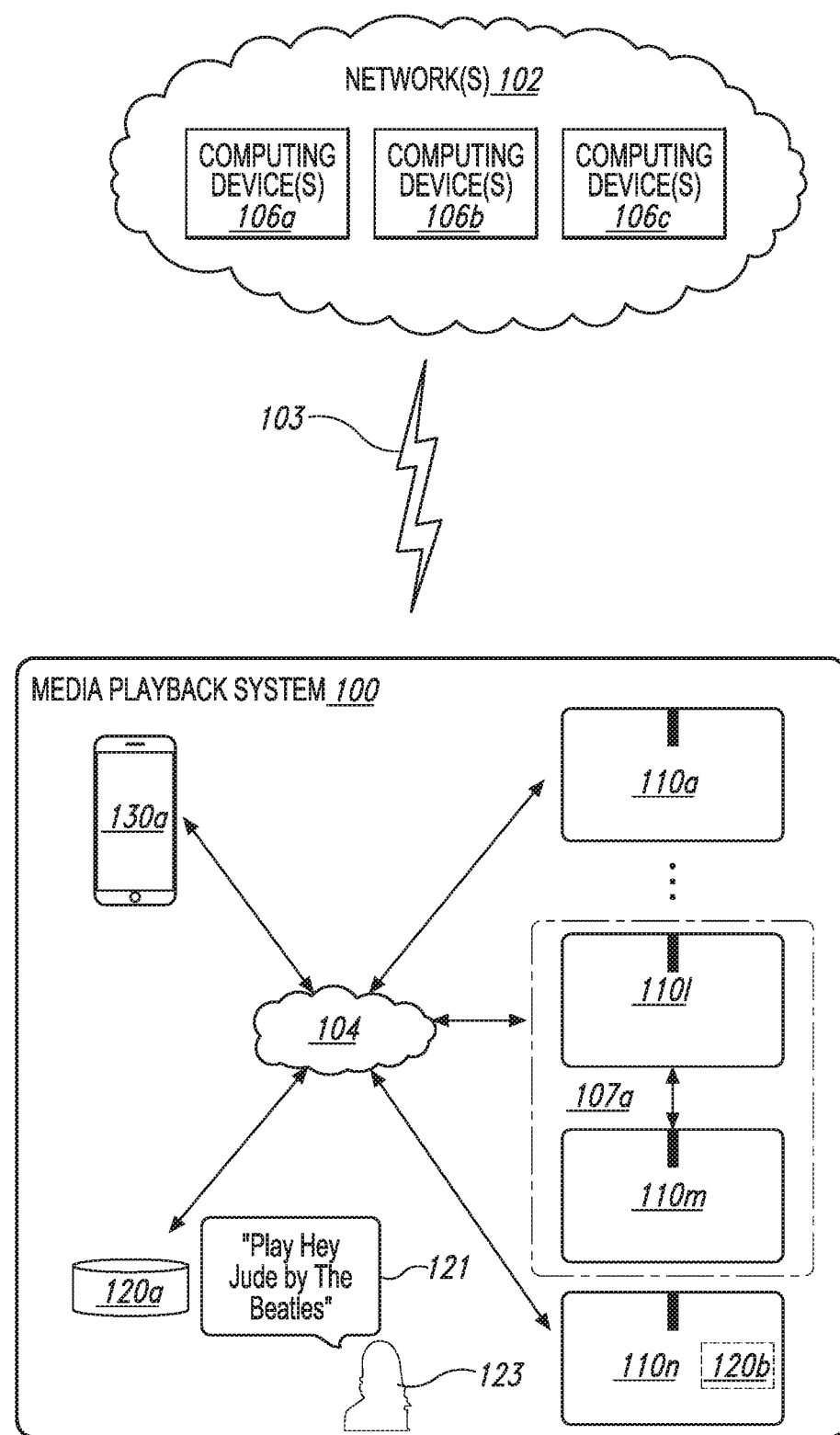
FIG. 1B is a schematic diagram of the media playback system of FIG. 1A and one or more networks.

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some embodiments, the cloud network 102 is further configured to receive data (e.g. voice input data) from the media playback system 100 and correspondingly transmit commands and/or media content to the media playback system 100.

The cloud network 102 comprises computing devices 106 (identified separately as a first computing device 106a, a second computing device 106b, and a third computing device 106c). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers. Moreover, while the cloud network 102 is described above in the context of a single cloud network, in some embodiments the cloud network 102 comprises a plurality of cloud networks comprising communicatively coupled computing devices. Furthermore, while the cloud network 102 is shown in FIG. 1B as having three of the computing devices 106, in some embodiments, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, and/or another suitable frequency.

In some embodiments, the network 104 comprises a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media playback system 100, thereby reducing interference and competition with other household devices. In other embodiments, however, the network 104 comprises an existing household communication network (e.g., a household WiFi network). In some embodiments, the links 103 and the network 104 comprise one or more of the same networks. In some aspects, for example, the links 103 and the network 104 comprise a telecommunication network (e.g., an LTE network, a 5G network). Moreover, in some embodiments, the media playback system 100 is implemented without the network 104, and devices comprising the media playback system 100 can communicate with each other, for example, via one or more direct connections, PANs, telecommunication networks, and/or other suitable communication links.

In some embodiments, audio content sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some embodiments, for example, the media content database is stored on one or more of the playback devices 110, network microphone devices 120, and/or control devices 130.

In the illustrated embodiment of FIG. 1B, the playback devices 110*l* and 110*m* comprise a group 107*a*. The playback devices 110*l* and 110*m* can be positioned in different rooms in a household and be grouped together in the group 107*a* on a temporary or permanent basis based on user input received at the control device 130*a* and/or another control device 130 in the media playback system 100. When arranged in the group 107*a*, the playback devices 110*l* and 110*m* can be configured to play back the same or similar audio content in synchrony from one or more audio content sources. In certain embodiments, for example, the group 107*a* comprises a bonded zone in which the playback devices 110*l* and 110*m* comprise left audio and right audio channels, respectively, of multi-channel audio content, thereby producing or enhancing a stereo effect of the audio content. In some embodiments, the group 107*a* includes additional playback devices 110. In other embodiments, however, the media playback system 100 omits the group 107*a* and/or other grouped arrangements of the playback devices 110. Additional details regarding groups and other arrangements of playback devices are described in further detail below with respect to FIGS. 1-I through 1M.

The media playback system 100 includes the NMDs 120*a* and 120*d*, each comprising one or more microphones configured to receive voice utterances from a user. In the illustrated embodiment of FIG. 1B, the NMD 120*a* is a standalone device and the NMD 120*d* is integrated into the playback device 110*n*. The NMD 120*a*, for example, is configured to receive voice input 121 from a user 123. In some embodiments, the NMD 120*a* transmits data associated with the received voice input 121 to a voice assistant service (VAS) configured to (i) process the received voice input data and (ii) transmit a corresponding command to the media playback system 100. In some aspects, for example, the computing device 106*c* comprises one or more modules and/or servers of a VAS (e.g., a VAS operated by one or more of SONOS®, AMAZON®, GOOGLE® APPLE®, MICROSOFT®). The computing device 106*c* can receive the voice input data from the NMD 120*a* via the network 104 and the links 103. In response to receiving the voice input data, the computing device 106*c* processes the voice input data (i.e., "Play Hey Jude by The Beatles"), and determines that the processed voice input includes a command to play a song (e.g., "Hey Jude"). The computing device 106*c* accordingly transmits commands to the media playback system 100 to play back "Hey Jude" by the Beatles from a suitable media service (e.g., via one or more of the computing devices 106) on one or more of the playback devices 110.

b. Suitable Playback Devices

FIG. 1C is a block diagram of the playback device 110*a* comprising an input/output (I/O) 111. The input/output 111 can include an analog I/O 111*a* (e.g., one or more wires, cables, and/or other suitable communication links configured to carry analog signals) and/or a digital I/O 111*b* (e.g., one or more wires, cables, or other suitable communication links configured to carry digital signals). In some embodiments, the analog I/O 111*a* is an audio line-in input connection comprising, for example, an auto-detecting 3.5 mm audio line-in connection. In some embodiments, the digital I/O 111*b* comprises a Sony/Philips Digital Interface Format (S/PDIF) communication interface and/or cable and/or a Toshiba Link (TOSLINK) cable. In some embodiments, the digital I/O 111*b* comprises a High-Definition Multimedia Interface (HDMI) interface and/or cable. In some embodiments, the digital I/O 111*b* includes one or more wireless communication links comprising, for example, a radio frequency (RF), infrared, WiFi, Bluetooth, or another suitable communication protocol. In certain embodiments, the analog I/O 111*a* and the digital 111*b* comprise interfaces (e.g., ports, plugs, jacks) configured to receive connectors of cables transmitting analog and digital signals, respectively, without necessarily including cables.

The playback device 110*a*, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 105 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110*a* does not include an input/output 111 and receives all audio content via the network 104.

The playback device 110*a* further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 are configured to receive audio from an audio source (e.g., the local audio source 105) via the input/output 111, one or more of the computing devices 106*a-c* via the network 104 (FIG. 1B)), amplify the received audio, and output the amplified audio for playback via one or more of the transducers 114. In some embodiments, the playback device 110*a* optionally includes one or more microphones 115 (e.g., a single microphone, a plurality of microphones, a microphone array) (hereinafter referred to as "the microphones 115"). In certain embodiments, for example, the playback device 110*a* having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112*a* (referred to hereinafter as "the processors 112*a*"), memory 112*b*, software components 112*c*, a network interface 112*d*, one or more audio processing components 112*g* (referred to hereinafter as "the audio components 112*g*"), one or more audio amplifiers 112*h* (referred to hereinafter as "the amplifiers 112*h*"), and power 112*i* (e.g., one or more power supplies, power cables, power receptacles, batteries, induction coils, Power-over Ethernet (POE) interfaces, and/or other suitable sources of electric power). In some embodiments, the electronics 112 optionally include one or more other components 112*j* (e.g., one or more sensors, video displays, touchscreens, battery charging bases).

The processors 112*a* can comprise clock-driven computing component(s) configured to process data, and the memory 112*b* can comprise a computer-readable medium (e.g., a tangible, non-transitory computer-readable medium, data storage loaded with one or more of the software components 112c) configured to store instructions for performing various operations and/or functions. The processors 112a are configured to execute the instructions stored on the memory 112b to perform one or more of the operations. The operations can include, for example, causing the playback device 110a to retrieve audio data from an audio source (e.g., one or more of the computing devices 106a-c (FIG. 1B)), and/or another one of the playback devices 110. In some embodiments, the operations further include causing the playback device 110a to send audio data to another one of the playback devices 110a and/or another device (e.g., one of the NMDs 120). Certain embodiments include operations causing the playback device 110a to pair with another of the one or more playback devices 110 to enable a multi-channel audio environment (e.g., a stereo pair, a bonded zone).

The processors 112a can be further configured to perform operations causing the playback device 110a to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110a and the other one or more other playback devices 110. Additional details regarding audio playback synchronization among playback devices can be found, for example, in U.S. Pat. No. 8,234,395, which was incorporated by reference above.

In some embodiments, the memory 112b is further configured to store data associated with the playback device 110a, such as one or more zones and/or zone groups of which the playback device 110a is a member, audio sources accessible to the playback device 110a, and/or a playback queue that the playback device 110a (and/or another of the one or more playback devices) can be associated with. The stored data can comprise one or more state variables that are periodically updated and used to describe a state of the playback device 110a. The memory 112b can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112d is configured to facilitate a transmission of data between the playback device 110a and one or more other devices on a data network such as, for example, the links 103 and/or the network 104 (FIG. 1B). The network interface 112d is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112d can parse the digital packet data such that the electronics 112 properly receives and processes the data destined for the playback device 110a.

In the illustrated embodiment of FIG. 1C, the network interface 112d comprises one or more wireless interfaces 112e (referred to hereinafter as "the wireless interface 112e"). The wireless interface 112e (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WiFi, Bluetooth, LTE). In some embodiments, the network interface 112d optionally includes a wired interface 112f (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112d includes the wired interface 112f and excludes the wireless interface 112e. In some embodiments, the electronics 112 excludes the network interface 112d altogether and transmits and receives media content and/or other data via another communication path (e.g., the input/output 111).

The audio components 112g are configured to process and/or filter data comprising media content received by the electronics 112 (e.g., via the input/output 111 and/or the network interface 112d) to produce output audio signals. In some embodiments, the audio processing components 112g comprise, for example, one or more digital-to-analog converters (DAC), audio preprocessing components, audio enhancement components, a digital signal processors (DSPs), and/or other suitable audio processing components, modules, circuits, etc. In certain embodiments, one or more of the audio processing components 112g can comprise one or more subcomponents of the processors 112a. In some embodiments, the electronics 112 omits the audio processing components 112g. In some aspects, for example, the processors 112a execute instructions stored on the memory 112b to perform audio processing operations to produce the output audio signals.

The amplifiers 112h are configured to receive and amplify the audio output signals produced by the audio processing components 112g and/or the processors 112a. The amplifiers 112h can comprise electronic devices and/or components configured to amplify audio signals to levels sufficient for driving one or more of the transducers 114. In some embodiments, for example, the amplifiers 112h include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112h comprise a suitable combination of two or more of the foregoing types of power amplifiers. Moreover, in some embodiments, individual ones of the amplifiers 112h correspond to individual ones of the transducers 114. In other embodiments, however, the electronics 112 includes a single one of the amplifiers 112h configured to output amplified audio signals to a plurality of the transducers 114. In some other embodiments, the electronics 112 omits the amplifiers 112h.

The transducers 114 (e.g., one or more speakers and/or speaker drivers) receive the amplified audio signals from the amplifier 112h and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

By way of illustration, SONOS, Inc. presently offers (or has offered) for sale certain playback devices including, for example, a "SONOS ONE," "PLAY:1," "PLAY:3," "PLAY: 5," "PLAYBAR," "PLAYBASE," "CONNECT:AMP," "CONNECT," and "SUB." Other suitable playback devices may additionally or alternatively be used to implement the playback devices of example embodiments disclosed herein. Additionally, one of ordinary skill in the art will appreciate that a playback device is not limited to the examples described herein or to SONOS product offerings. In some embodiments, for example, one or more playback devices 110 comprises wired or wireless headphones (e.g., over-the-ear headphones, on-ear headphones, in-ear earphones). In other embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110*p* comprising the input/output 111 and electronics 112 without the user interface 113 or transducers 114.

FIG. 1E is a block diagram of a bonded playback device 110*q* comprising the playback device 110*a* (FIG. 1C) sonically bonded with the playback device 110*i* (e.g., a subwoofer) (FIG. 1A). In the illustrated embodiment, the playback devices 110*a* and 110*i* are separate ones of the playback devices 110 housed in separate enclosures. In some embodiments, however, the bonded playback device 110*q* comprises a single enclosure housing both the playback devices 110*a* and 110*i*. The bonded playback device 110*q* can be configured to process and reproduce sound differently than an unbonded playback device (e.g., the playback device 110*a* of FIG. 1C) and/or paired or bonded playback devices (e.g., the playback devices 110*l* and 110*m* of FIG. 1B). In some embodiments, for example, the playback device 110*a* is full-range playback device configured to render low frequency, mid-range frequency, and high frequency audio content, and the playback device 110*i* is a subwoofer configured to render low frequency audio content. In some aspects, the playback device 110*a*, when bonded with the first playback device, is configured to render only the mid-range and high frequency components of a particular audio content, while the playback device 110*i* renders the low frequency component of the particular audio content. In some embodiments, the bonded playback device 110*q* includes additional playback devices and/or another bonded playback device. Additional playback device embodiments are described in further detail below with respect to FIGS. 2A-3D.

c. Suitable Network Microphone Devices (NMDs)

FIG. 1F is a block diagram of the NMD 120*a* (FIGS. 1A and 1B). The NMD 120*a* includes one or more voice processing components 124 (hereinafter "the voice components 124") and several components described with respect to the playback device 110*a* (FIG. 1C) including the processors 112*a*, the memory 112*b*, and the microphones 115. The NMD 120*a* optionally comprises other components also included in the playback device 110*a* (FIG. 1C), such as the user interface 113 and/or the transducers 114. In some embodiments, the NMD 120*a* is configured as a media playback device (e.g., one or more of the playback devices 110), and further includes, for example, one or more of the audio components 112*g* (FIG. 1C), the amplifiers 114, and/or other playback device components. In certain embodiments, the NMD 120*a* comprises an Internet of Things (IoT) device such as, for example, a thermostat, alarm panel, fire and/or smoke detector, etc. In some embodiments, the NMD 120*a* comprises the microphones 115, the voice processing 124, and only a portion of the components of the electronics 112 described above with respect to FIG. 1B. In some aspects, for example, the NMD 120*a* includes the processor 112*a* and the memory 112*b* (FIG. 1B), while omitting one or more other components of the electronics 112. In some embodiments, the NMD 120*a* includes additional components (e.g., one or more sensors, cameras, thermometers, barometers, hygrometers).

In some embodiments, an NMD can be integrated into a playback device. FIG. 1G is a block diagram of a playback device 110*r* comprising an NMD 120*d*. The playback device 110*r* can comprise many or all of the components of the playback device 110*a* and further include the microphones 115 and voice processing 124 (FIG. 1F). The playback device 110*r* optionally includes an integrated control device 130*c*. The control device 130*c* can comprise, for example, a user interface (e.g., the user interface 113 of FIG. 1B) configured to receive user input (e.g., touch input, voice input) without a separate control device. In other embodiments, however, the playback device 110*r* receives commands from another control device (e.g., the control device 130*a* of FIG. 1B). Additional NMD embodiments are described in further detail below with respect to FIGS. 3A-3F.

Referring again to FIG. 1F, the microphones 115 are configured to acquire, capture, and/or receive sound from an environment (e.g., the environment 101 of FIG. 1A) and/or a room in which the NMD 120*a* is positioned. The received sound can include, for example, vocal utterances, audio played back by the NMD 120*a* and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing 124 monitors the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home. Additional description regarding receiving and processing voice input data can be found in further detail below with respect to FIGS. 3A-3F.

d. Suitable Control Devices

FIG. 1H is a partially schematic diagram of the control device 130a (FIGS. 1A and 1B). As used herein, the term "control device" can be used interchangeably with "controller" or "control system." Among other features, the control device 130a is configured to receive user input related to the media playback system 100 and, in response, cause one or more devices in the media playback system 100 to perform an action(s) or operation(s) corresponding to the user input. In the illustrated embodiment, the control device 130a comprises a smartphone (e.g., an iPhone™, an Android phone) on which media playback system controller application software is installed. In some embodiments, the control device 130a comprises, for example, a tablet (e.g., an iPad™), a computer (e.g., a laptop computer, a desktop computer), and/or another suitable device (e.g., a television, an automobile audio head unit, an IoT device). In certain embodiments, the control device 130a comprises a dedicated controller for the media playback system 100. In other embodiments, as described above with respect to FIG. 1G, the control device 130a is integrated into another device in the media playback system 100 (e.g., one more of the playback devices 110, NMDs 120, and/or other suitable devices configured to communicate over a network).

The control device 130a includes electronics 132, a user interface 133, one or more speakers 134, and one or more microphones 135. The electronics 132 comprise one or more processors 132a (referred to hereinafter as "the processors 132a"), a memory 132b, software components 132c, and a network interface 132d. The processor 132a can be configured to perform functions relevant to facilitating user access, control, and configuration of the media playback system 100. The memory 132b can comprise data storage that can be loaded with one or more of the software components executable by the processor 302 to perform those functions. The software components 132c can comprise applications and/or other executable software configured to facilitate control of the media playback system 100. The memory 112b can be configured to store, for example, the software components 132c, media playback system controller application software, and/or other data associated with the media playback system 100 and the user.

The network interface 132d is configured to facilitate network communications between the control device 130a and one or more other devices in the media playback system 100, and/or one or more remote devices. In some embodiments, the network interface 132 is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132d can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132d can transmit a playback device control command (e.g., volume control, audio playback control, audio content selection) from the control device 304 to one or more of the playback devices 100. The network interface 132d can also transmit and/or receive configuration changes such as, for example, adding/removing one or more playback devices 100 to/from a zone, adding/removing one or more zones to/from a zone group, forming a bonded or consolidated player, separating one or more playback devices from a bonded or consolidated player, among others. Additional description of zones and groups can be found below with respect to FIGS. 1-I through 1M.

The user interface 133 is configured to receive user input and control or at least facilitate control of the media playback system 100. The user interface 133 includes media content art 133a (e.g., album art, lyrics, videos), a playback status indicator 133b (e.g., an elapsed and/or remaining time indicator), media content information region 133c, a playback control region 133d, and a zone indicator 133e. The media content information region 133c can include a display of relevant information (e.g., title, artist, album, genre, release year) about media content currently playing and/or media content in a queue or playlist. The playback control region 133d can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133d may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone). In some embodiments, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130a. In some embodiments, the one or more speakers comprise individual transducers configured to correspondingly output low frequencies, mid-range frequencies, and/or high frequencies. In some aspects, for example, the control device 130a is configured as a playback device (e.g., one of the playback devices 110). Similarly, in some embodiments the control device 130a is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130a is configured to operate as a playback device and an NMD. In other embodiments, however, the control device 130a omits the one or more speakers 134 and/or the one or more microphones 135. For instance, the control device 130a may comprise a device (e.g., a thermostat, an IoT device, a network device) comprising a portion of the electronics 132 and the user interface 133 (e.g., a touch screen) without any speakers or microphones. Additional control device embodiments are described in further detail below with respect to FIGS. 4A-4D and 5.

e. Suitable Playback Device Configurations

Figure 1M:
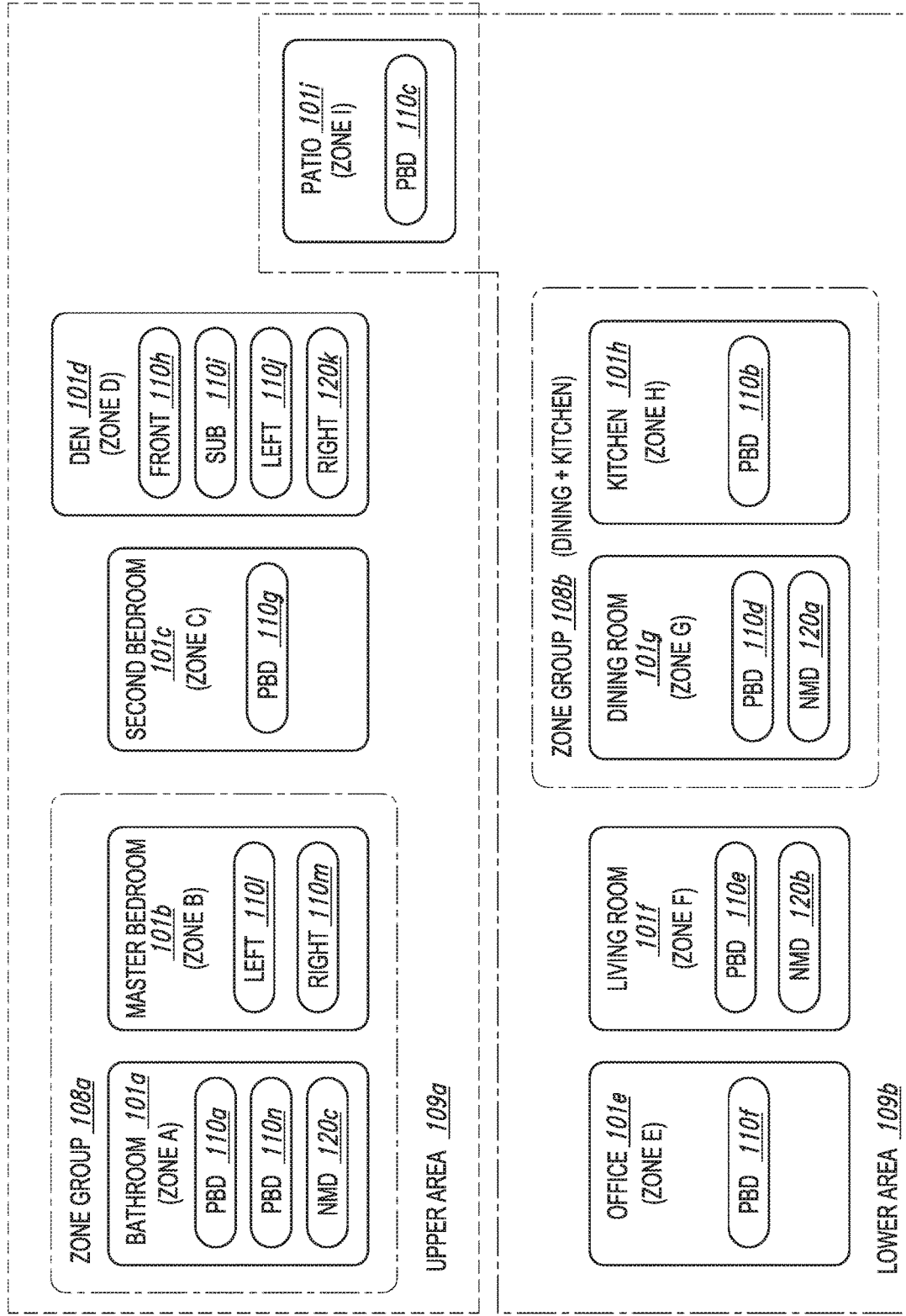
FIG. 1M is a schematic diagram of media playback system areas.

FIGS. 1-I through 1M show example configurations of playback devices in zones and zone groups. Referring first to FIG. 1M, in one example, a single playback device may belong to a zone. For example, the playback device 110g in the second bedroom 101c (FIG. 1A) may belong to Zone C. In some implementations described below, multiple playback devices may be "bonded" to form a "bonded pair" which together form a single zone. For example, the playback device 110l (e.g., a left playback device) can be bonded to the playback device 110l (e.g., a left playback device) to form Zone A. Bonded playback devices may have different playback responsibilities (e.g., channel responsibilities). In another implementation described below, multiple playback devices may be merged to form a single zone. For example, the playback device 110h (e.g., a front playback device) may be merged with the playback device 110i (e.g., a subwoofer), and the playback devices 110j and 110k (e.g., left and right surround speakers, respectively) to form a single Zone D. In another example, the playback devices 110g and 110h can be merged to form a merged group or a zone group 108b. The merged playback devices 110g and 110h may not be specifically assigned different playback responsibilities. That is, the merged playback devices 110h and 110i may, aside from playing audio content in synchrony, each play audio content as they would if they were not merged.

Each zone in the media playback system 100 may be provided for control as a single user interface (UI) entity. For example, Zone A may be provided as a single entity named Master Bathroom. Zone B may be provided as a single entity named Master Bedroom. Zone C may be provided as a single entity named Second Bedroom.

Playback devices that are bonded may have different playback responsibilities, such as responsibilities for certain audio channels. For example, as shown in FIG. 1-I, the playback devices 110l and 110m may be bonded so as to produce or enhance a stereo effect of audio content. In this example, the playback device 110l may be configured to play a left channel audio component, while the playback device 110k may be configured to play a right channel audio component. In some implementations, such stereo bonding may be referred to as "pairing."

Additionally, bonded playback devices may have additional and/or different respective speaker drivers. As shown in FIG. 1J, the playback device 110h named Front may be bonded with the playback device 110i named SUB. The Front device 110h can be configured to render a range of mid to high frequencies and the SUB device 110i can be configured render low frequencies. When unbonded, however, the Front device 110h can be configured render a full range of frequencies. As another example, FIG. 1K shows the Front and SUB devices 110h and 110i further bonded with Left and Right playback devices 110j and 110k, respectively.

In some implementations, the Right and Left devices 110j and 102k can be configured to form surround or "satellite" channels of a home theater system. The bonded playback devices 110h, 110i, 110j, and 110k may form a single Zone D (FIG. 1M).

Playback devices that are merged may not have assigned playback responsibilities, and may each render the full range of audio content the respective playback device is capable of. Nevertheless, merged devices may be represented as a single UI entity (i.e., a zone, as discussed above). For instance, the playback devices 110a and 110n the master bathroom have the single UI entity of Zone A. In one embodiment, the playback devices 110a and 110n may each output the full range of audio content each respective playback devices 110a and 110n are capable of, in synchrony.

In some embodiments, an NMD is bonded or merged with another device so as to form a zone. For example, the NMD 120b may be bonded with the playback device 110e, which together form Zone F, named Living Room. In other embodiments, a stand-alone network microphone device may be in a zone by itself. In other embodiments, however, a stand-alone network microphone device may not be associated with a zone. Additional details regarding associating network microphone devices and playback devices as designated or default devices may be found, for example, in previously referenced U.S. patent application Ser. No. 15/438,749.

Zones of individual, bonded, and/or merged devices may be grouped to form a zone group. For example, referring to FIG. 1M, Zone A may be grouped with Zone B to form a zone group 108a that includes the two zones. Similarly, Zone G may be grouped with Zone H to form the zone group 108b. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Playback devices may be dynamically grouped and ungrouped to form new or different groups that synchronously play back audio content.

In various implementations, the zones in an environment may be the default name of a zone within the group or a combination of the names of the zones within a zone group. For example, Zone Group 108b can have be assigned a name such as "Dining+Kitchen", as shown in FIG. 1M. In some embodiments, a zone group may be given a unique name selected by a user.

Certain data may be stored in a memory of a playback device (e.g., the memory 112c of FIG. 1C) as one or more state variables that are periodically updated and used to describe the state of a playback zone, the playback device(s), and/or a zone group associated therewith. The memory may also include the data associated with the state of the other devices of the media system, and shared from time to time among the devices so that one or more of the devices have the most recent data associated with the system.

In some embodiments, the memory may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, identifiers associated with the second bedroom 101c may indicate that the playback device is the only playback device of the Zone C and not in a zone group. Identifiers associated with the Den may indicate that the Den is not grouped with other zones but includes bonded playback devices 110h-110k. Identifiers associated with the Dining Room may indicate that the Dining Room is part of the Dining+Kitchen zone group 108b and that devices 110b and 110d are grouped (FIG. 1L). Identifiers associated with the Kitchen may indicate the same or similar information by virtue of the Kitchen being part of the Dining+Kitchen zone group 108b. Other example zone variables and identifiers are described below.

In yet another example, the media playback system 100 may variables or identifiers representing other associations of zones and zone groups, such as identifiers associated with Areas, as shown in FIG. 1M. An area may involve a cluster of zone groups and/or zones not within a zone group. For instance, FIG. 1M shows an Upper Area 109a including Zones A-D, and a Lower Area 109b including Zones E-I. In one aspect, an Area may be used to invoke a cluster of zone groups and/or zones that share one or more zones and/or zone groups of another cluster. In another aspect, this differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the media playback system 100 may not implement Areas, in which case the system may not store variables associated with Areas.

III. Example Systems and Devices

Figure 2A:
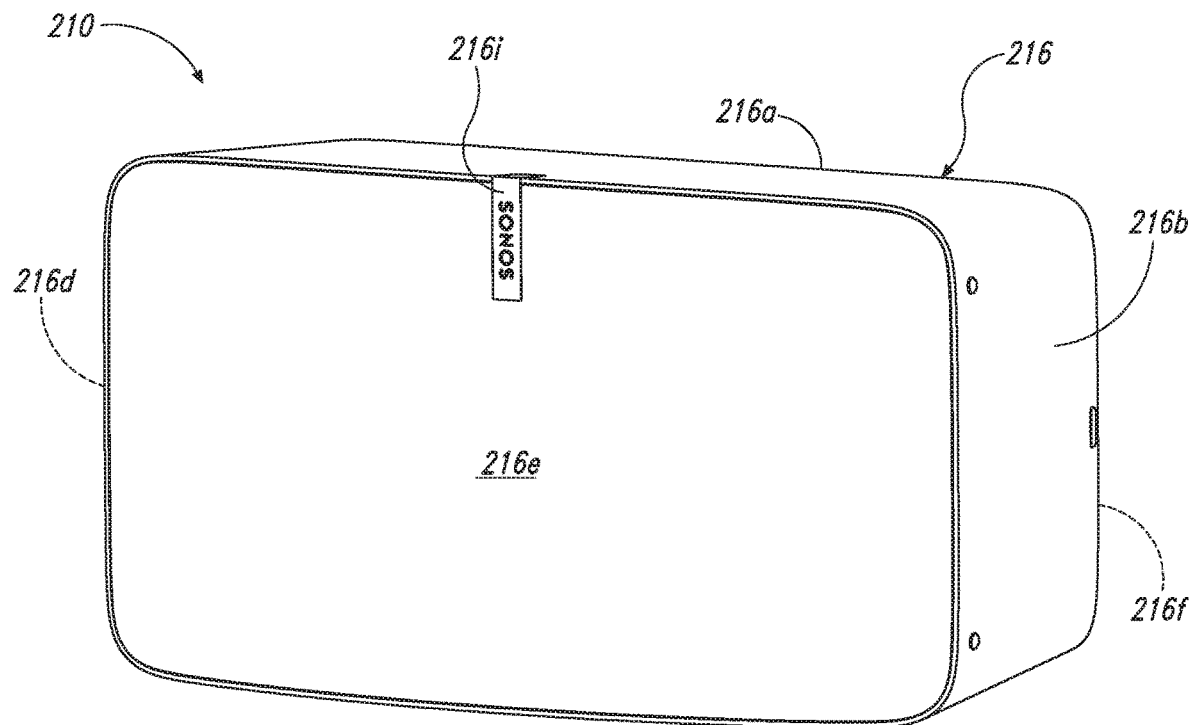
FIG. 2A is a front isometric view of a playback device configured in accordance with aspects of the disclosed technology.
Figure 2B:
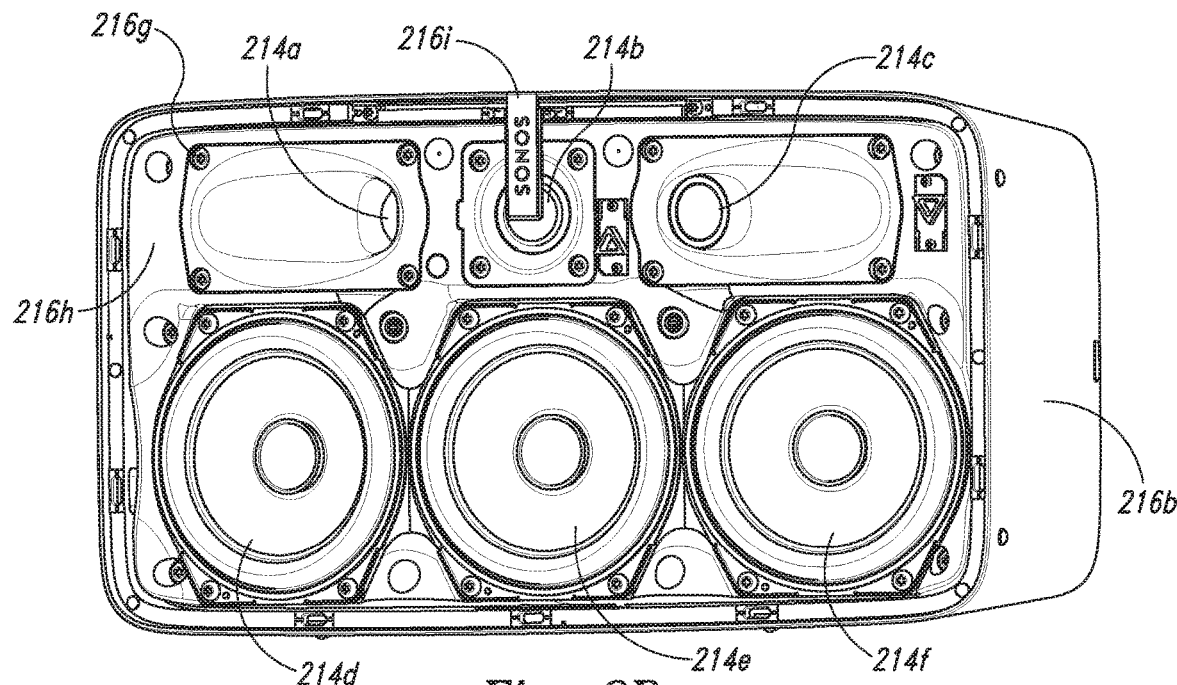
FIG. 2B is a front isometric view of the playback device of FIG. 3A without a grille.
Figure 2C:
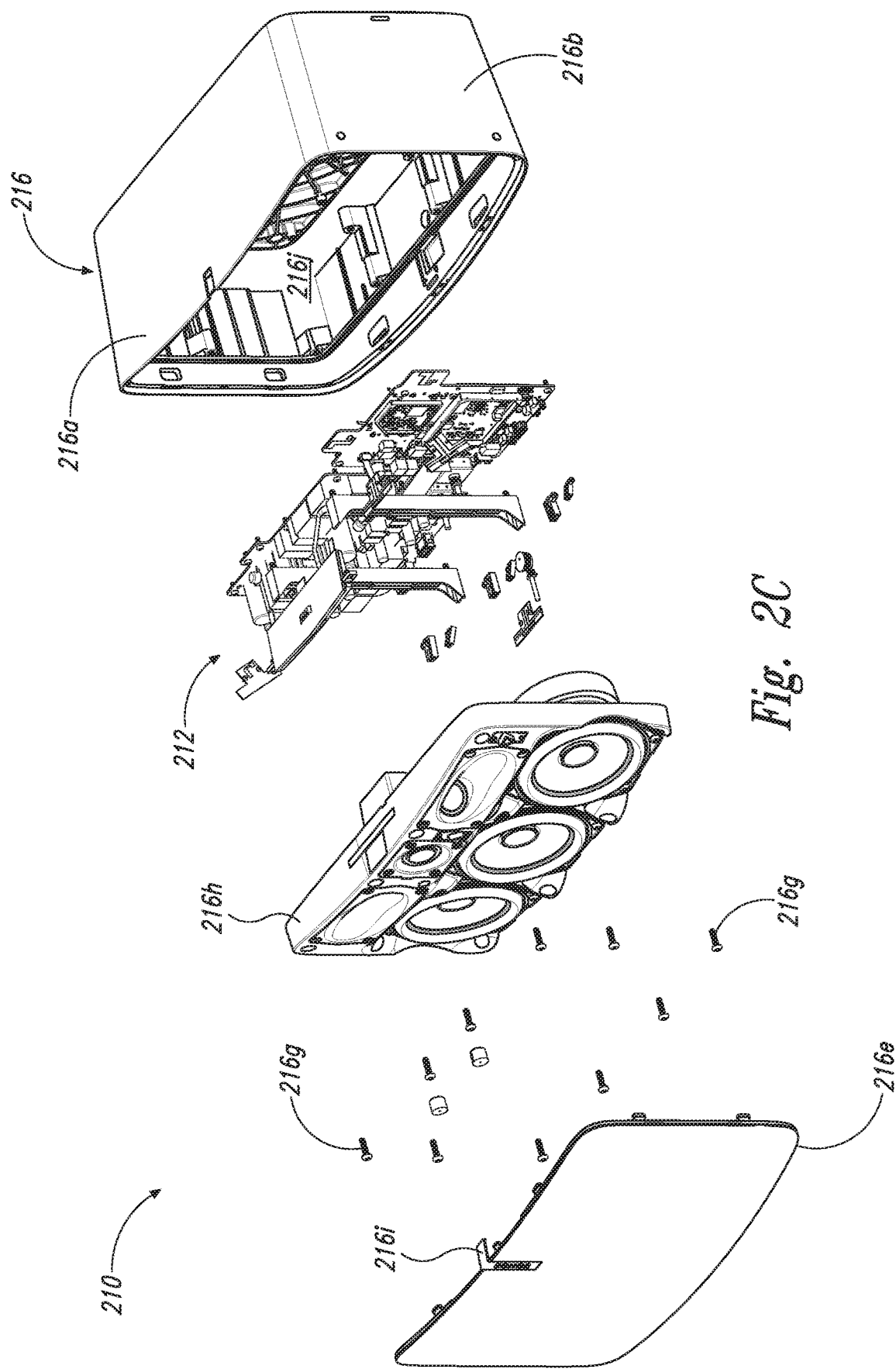
FIG. 2C is an exploded view of the playback device of FIG. 2A.

FIG. 2A is a front isometric view of a playback device 210 configured in accordance with aspects of the disclosed technology. FIG. 2B is a front isometric view of the playback device 210 without a grille 216e. FIG. 2C is an exploded view of the playback device 210. Referring to FIGS. 2A-2C together, the playback device 210 comprises a housing 216 that includes an upper portion 216a, a right or first side portion 216b, a lower portion 216c, a left or second side portion 216d, the grille 216e, and a rear portion 216f. A plurality of fasteners 216g (e.g., one or more screws, rivets, clips) attaches a frame 216h to the housing 216. A cavity 216j (FIG. 2C) in the housing 216 is configured to receive the frame 216h and electronics 212. The frame 216h is configured to carry a plurality of transducers 214 (identified individually in FIG. 2B as transducers 214a-f). The electronics 212 (e.g., the electronics 112 of FIG. 1C) is configured to receive audio content from an audio source and send electrical signals corresponding to the audio content to the transducers 214 for playback.

The transducers 214 are configured to receive the electrical signals from the electronics 112, and further configured to convert the received electrical signals into audible sound during playback. For instance, the transducers 214a-c (e.g., tweeters) can be configured to output high frequency sound (e.g., sound waves having a frequency greater than about 2 kHz). The transducers 214d-f (e.g., mid-woofers, woofers, midrange speakers) can be configured output sound at frequencies lower than the transducers 214a-c (e.g., sound waves having a frequency lower than about 2 kHz). In some embodiments, the playback device 210 includes a number of transducers different than those illustrated in FIGS. 2A-2C. For example, as described in further detail below with respect to FIGS. 3A-3C, the playback device 210 can include fewer than six transducers (e.g., one, two, three). In other embodiments, however, the playback device 210 includes more than six transducers (e.g., nine, ten). Moreover, in some embodiments, all or a portion of the transducers 214 are configured to operate as a phased array to desirably adjust (e.g., narrow or widen) a radiation pattern of the transducers 214, thereby altering a user's perception of the sound emitted from the playback device 210.

In the illustrated embodiment of FIGS. 2A-2C, a filter 216i is axially aligned with the transducer 214b. The filter 216i can be configured to desirably attenuate a predetermined range of frequencies that the transducer 214b outputs to improve sound quality and a perceived sound stage output collectively by the transducers 214. In some embodiments, however, the playback device 210 omits the filter 216i. In other embodiments, the playback device 210 includes one or more additional filters aligned with the transducers 214b and/or at least another of the transducers 214.

Figure 3A:
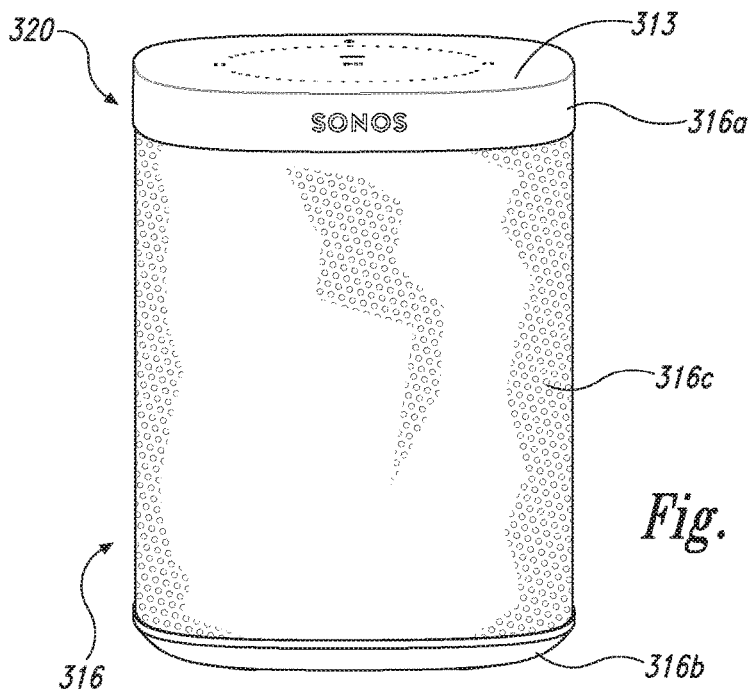
FIG. 3A is a front view of a network microphone device configured in accordance with aspects of the disclosed technology.
Figure 3B:
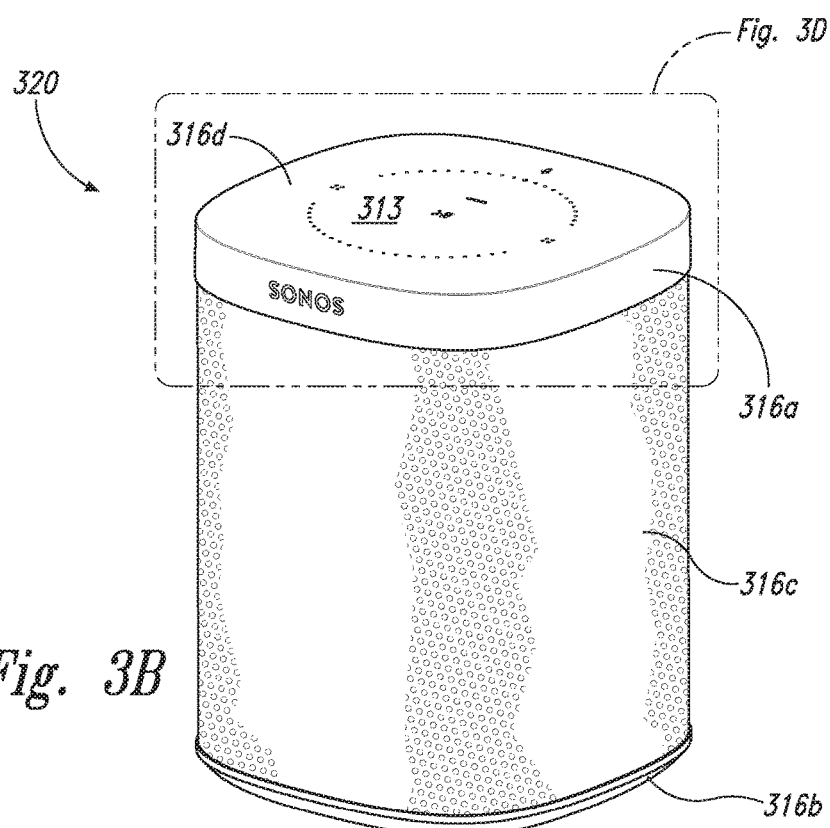
FIG. 3B is a side isometric view of the network microphone device of FIG. 3A.
Figure 3C:
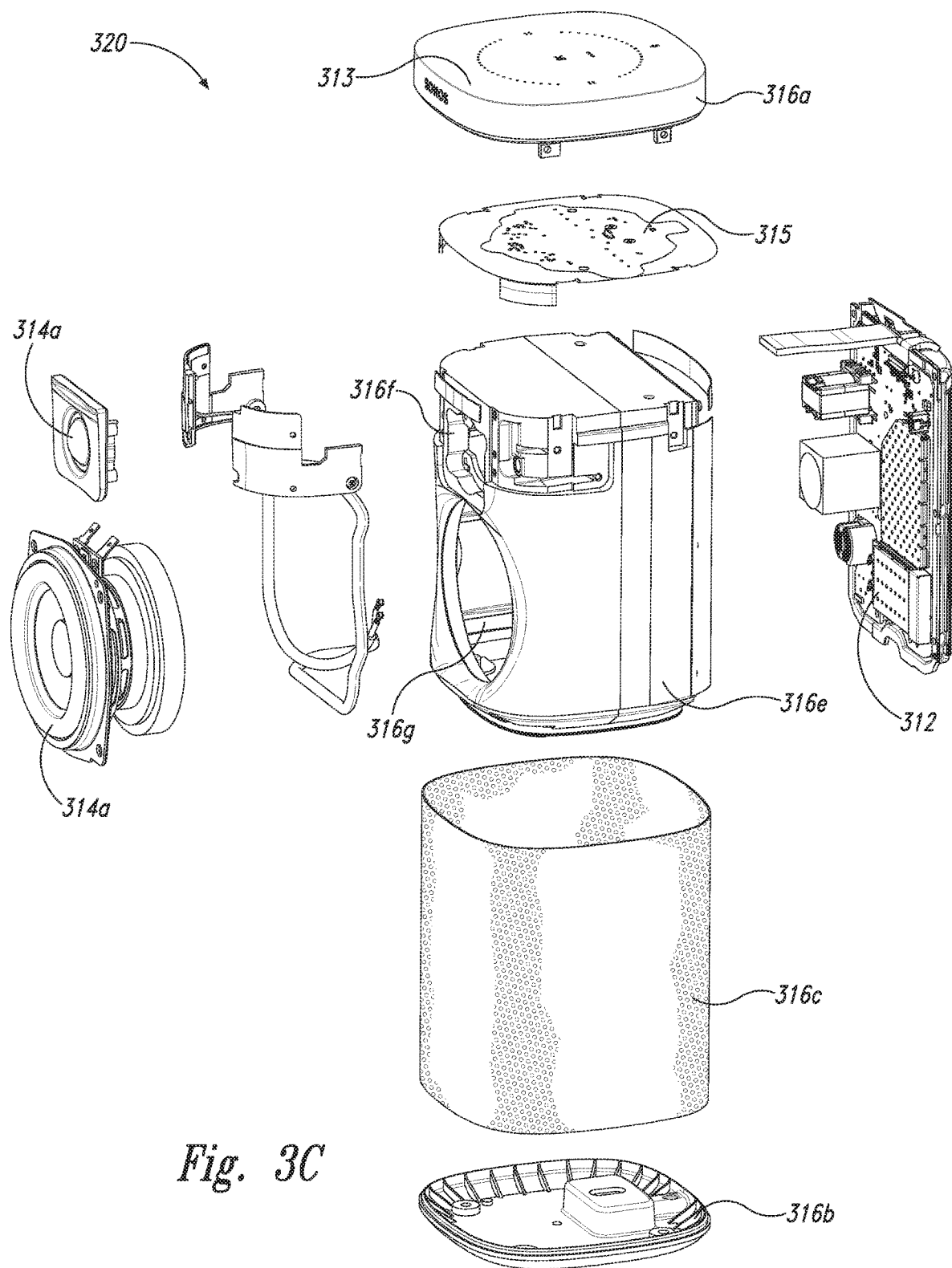
FIG. 3C is an exploded view of the network microphone device of FIGS. 3A and 3B.
Figure 3D:
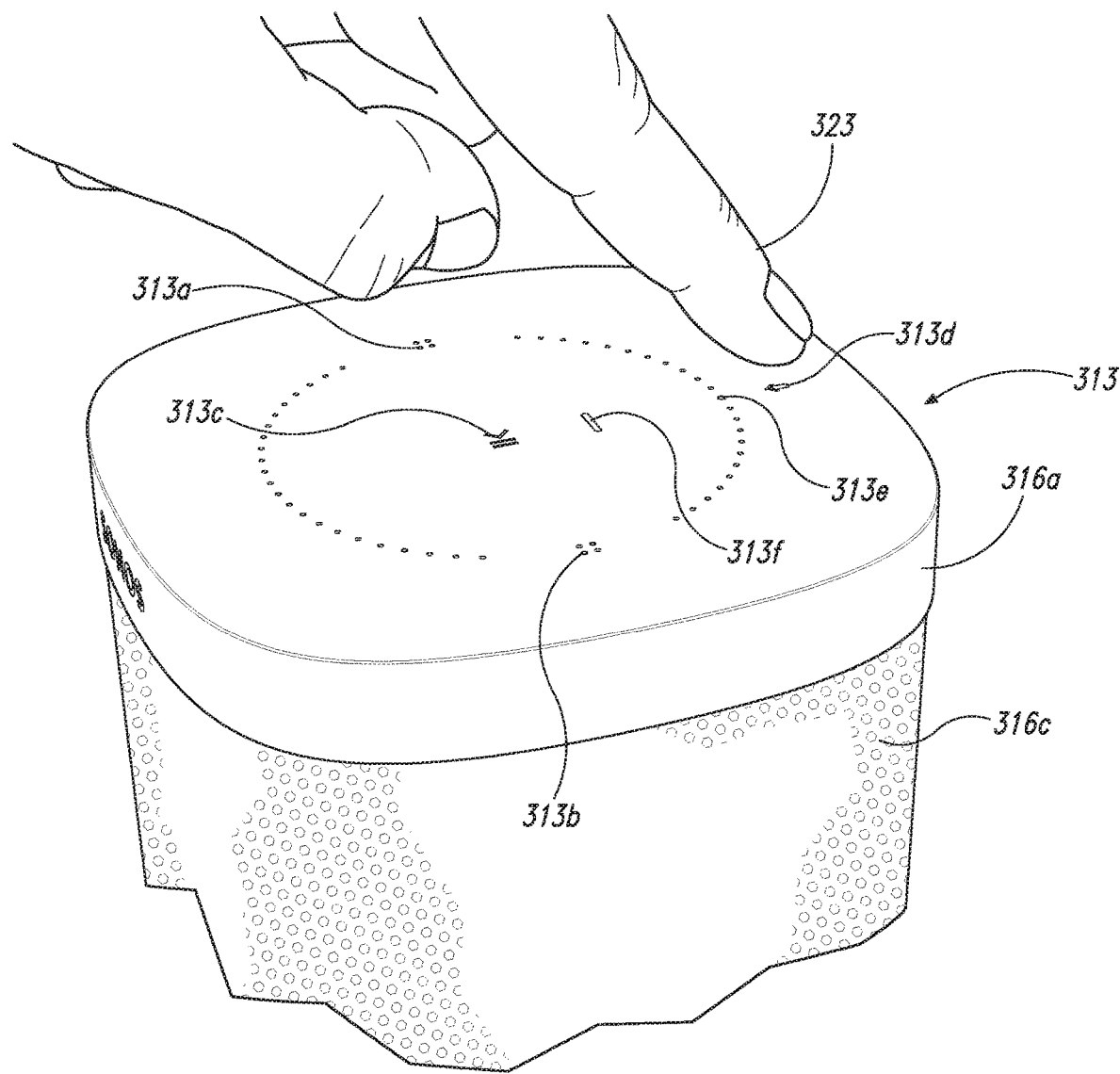
FIG. 3D is an enlarged view of a portion of FIG. 3B.

FIGS. 3A and 3B are front and right isometric side views, respectively, of an NMD 320 configured in accordance with embodiments of the disclosed technology. FIG. 3C is an exploded view of the NMD 320. FIG. 3D is an enlarged view of a portion of FIG. 3B including a user interface 313 of the NMD 320. Referring first to FIGS. 3A-3C, the NMD 320 includes a housing 316 comprising an upper portion 316a, a lower portion 316b and an intermediate portion 316c (e.g., a grille). A plurality of ports, holes or apertures 316d in the upper portion 316a allow sound to pass through to one or more microphones 315 (FIG. 3C) positioned within the housing 316. The one or more microphones 316 are configured to received sound via the apertures 316d and produce electrical signals based on the received sound. In the illustrated embodiment, a frame 316e (FIG. 3C) of the housing 316 surrounds cavities 316f and 316g configured to house, respectively, a first transducer 314a (e.g., a tweeter) and a second transducer 314b (e.g., a mid-woofer, a midrange speaker, a woofer). In other embodiments, however, the NMD 320 includes a single transducer, or more than two (e.g., two, five, six) transducers. In certain embodiments, the NMD 320 omits the transducers 314a and 314b altogether.

Electronics 312 (FIG. 3C) includes components configured to drive the transducers 314a and 314b, and further configured to analyze audio data corresponding to the electrical signals produced by the one or more microphones 315. In some embodiments, for example, the electronics 312 comprises many or all of the components of the electronics 112 described above with respect to FIG. 1C. In certain embodiments, the electronics 312 includes components described above with respect to FIG. 1F such as, for example, the one or more processors 112a, the memory 112b, the software components 112c, the network interface 112d, etc. In some embodiments, the electronics 312 includes additional suitable components (e.g., proximity or other sensors).

Referring to FIG. 3D, the user interface 313 includes a plurality of control surfaces (e.g., buttons, knobs, capacitive surfaces) including a first control surface 313a (e.g., a previous control), a second control surface 313b (e.g., a next control), and a third control surface 313c (e.g., a play and/or pause control). A fourth control surface 313d is configured to receive touch input corresponding to activation and deactivation of the one or microphones 315. A first indicator 313e (e.g., one or more light emitting diodes (LEDs) or another suitable illuminator) can be configured to illuminate only when the one or more microphones 315 are activated. A second indicator 313f (e.g., one or more LEDs) can be configured to remain solid during normal operation and to blink or otherwise change from solid to indicate a detection of voice activity. In some embodiments, the user interface 313 includes additional or fewer control surfaces and illuminators. In one embodiment, for example, the user interface 313 includes the first indicator 313e, omitting the second indicator 313f. Moreover, in certain embodiments, the NMD 320 comprises a playback device and a control device, and the user interface 313 comprises the user interface of the control device.

Referring to FIGS. 3A-3D together, the NMD 320 is configured to receive voice commands from one or more adjacent users via the one or more microphones 315. As described above with respect to FIG. 1B, the one or more microphones 315 can acquire, capture, or record sound in a vicinity (e.g., a region within 10m or less of the NMD 320) and transmit electrical signals corresponding to the recorded sound to the electronics 312. The electronics 312 can process the electrical signals and can analyze the resulting audio data to determine a presence of one or more voice commands (e.g., one or more activation words). In some embodiments, for example, after detection of one or more suitable voice commands, the NMD 320 is configured to transmit a portion of the recorded audio data to another device and/or a remote server (e.g., one or more of the computing devices 106 of FIG. 1B) for further analysis. The remote server can analyze the audio data, determine an appropriate action based on the voice command, and transmit a message to the NMD 320 to perform the appropriate action. For instance, a user may speak "Sonos, play Michael Jackson." The NMD 320 can, via the one or more microphones 315, record the user's voice utterance, determine the presence of a voice command, and transmit the audio data having the voice command to a remote server (e.g., one or more of the remote computing devices 106 of FIG. 1B, one or more servers of a VAS and/or another suitable service). The remote server can analyze the audio data and determine an action corresponding to the command. The remote server can then transmit a command to the NMD 320 to perform the determined action (e.g., play back audio content related to Michael Jackson). The NMD 320 can receive the command and play back the audio content related to Michael Jackson from a media content source. As described above with respect to FIG. 1B, suitable content sources can include a device or storage communicatively coupled to the NMD 320 via a LAN (e.g., the network 104 of FIG. 1B), a remote server (e.g., one or more of the remote computing devices 106 of FIG. 1B), etc. In certain embodiments, however, the NMD 320 determines and/or performs one or more actions corresponding to the one or more voice commands without intervention or involvement of an external device, computer, or server.

Figure 3E:
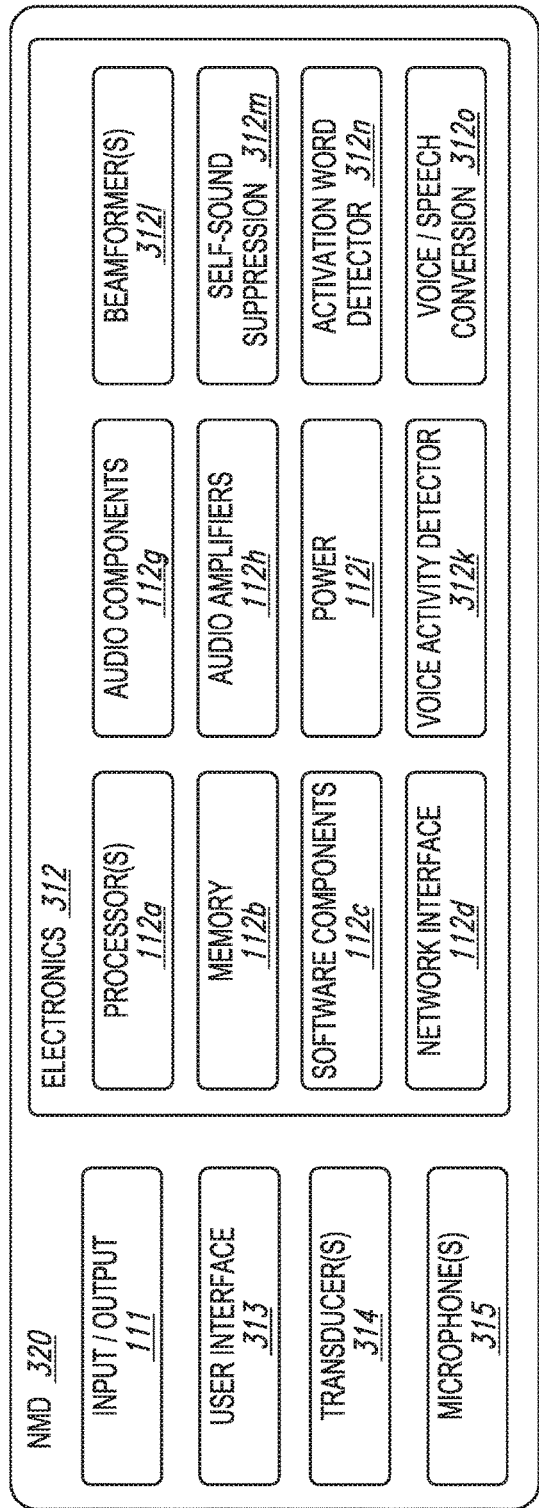
FIG. 3E is a block diagram of the network microphone device of FIGS. 3A-3D

FIG. 3E is a functional block diagram showing additional features of the NMD 320 in accordance with aspects of the disclosure. The NMD 320 includes components configured to facilitate voice command capture including voice activity detector component(s) 312k, beam former components 312l, acoustic echo cancellation (AEC) and/or self-sound suppression components 312m, activation word detector components 312n, and voice/speech conversion components 312o (e.g., voice-to-text and text-to-voice). In the illustrated embodiment of FIG. 3E, the foregoing components 312k-312o are shown as separate components. In some embodiments, however, one or more of the components 312k-312o are subcomponents of the processors 112a.

The beamforming and self-sound suppression components 312l and 312m are configured to detect an audio signal and determine aspects of voice input represented in the detected audio signal, such as the direction, amplitude, frequency spectrum, etc. The voice activity detector activity components 312k are operably coupled with the beamforming and AEC components 312l and 312m and are configured to determine a direction and/or directions from which voice activity is likely to have occurred in the detected audio signal. Potential speech directions can be identified by monitoring metrics which distinguish speech from other sounds. Such metrics can include, for example, energy within the speech band relative to background noise and entropy within the speech band, which is measure of spectral structure. As those of ordinary skill in the art will appreciate, speech typically has a lower entropy than most common background noise.

The activation word detector components 312n are configured to monitor and analyze received audio to determine if any activation words (e.g., wake words) are present in the received audio. The activation word detector components 312n may analyze the received audio using an activation word detection algorithm. If the activation word detector 312n detects an activation word, the NMD 320 may process voice input contained in the received audio. Example activation word detection algorithms accept audio as input and provide an indication of whether an activation word is present in the audio. Many first- and third-party activation word detection algorithms are known and commercially available. For instance, operators of a voice service may make their algorithm available for use in third-party devices. Alternatively, an algorithm may be trained to detect certain activation words. In some embodiments, the activation word detector 312n runs multiple activation word detection algorithms on the received audio simultaneously (or substantially simultaneously). As noted above, different voice services (e.g. AMAZON's ALEXA®, APPLE's SIRI®, or MICROSOFT's CORTANA®) can each use a different activation word for invoking their respective voice service. To support multiple services, the activation word detector 312n may run the received audio through the activation word detection algorithm for each supported voice service in parallel.

The speech/text conversion components 312o may facilitate processing by converting speech in the voice input to text. In some embodiments, the electronics 312 can include voice recognition software that is trained to a particular user or a particular set of users associated with a household. Such voice recognition software may implement voice-processing algorithms that are tuned to specific voice profile(s). Tuning to specific voice profiles may require less computationally intensive algorithms than traditional voice activity services, which typically sample from a broad base of users and diverse requests that are not targeted to media playback systems.

Figure 3F:
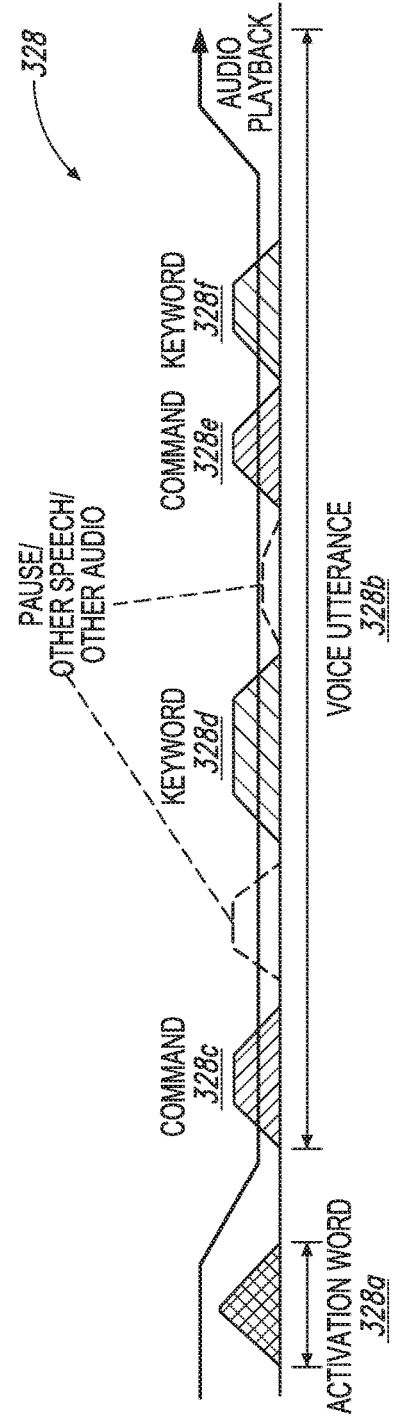
FIG. 3F is a schematic diagram of an example voice input.

FIG. 3F is a schematic diagram of an example voice input 328 captured by the NMD 320 in accordance with aspects of the disclosure. The voice input 328 can include a activation word portion 328a and a voice utterance portion 328b. In some embodiments, the activation word 557a can be a known activation word, such as "Alexa," which is associated with AMAZON's ALEXA®. In other embodiments, however, the voice input 328 may not include a activation word. In some embodiments, a network microphone device may output an audible and/or visible response upon detection of the activation word portion 328a. In addition or alternately, an NMB may output an audible and/or visible response after processing a voice input and/or a series of voice inputs.

The voice utterance portion 328b may include, for example, one or more spoken commands (identified individually as a first command 328c and a second command 328e) and one or more spoken keywords (identified individually as a first keyword 328d and a second keyword 328f). In one example, the first command 328c can be a command to play music, such as a specific song, album, playlist, etc. In this example, the keywords may be one or words identifying one or more zones in which the music is to be played, such as the Living Room and the Dining Room shown in FIG. 1A. In some examples, the voice utterance portion 328b can include other information, such as detected pauses (e.g., periods of non-speech) between words spoken by a user, as shown in FIG. 3F. The pauses may demarcate the locations of separate commands, keywords, or other information spoke by the user within the voice utterance portion 328b.

In some embodiments, the media playback system 100 is configured to temporarily reduce the volume of audio content that it is playing while detecting the activation word portion 557a. The media playback system 100 may restore the volume after processing the voice input 328, as shown in FIG. 3F. Such a process can be referred to as ducking, examples of which are disclosed in U.S. patent application Ser. No. 15/438,749, incorporated by reference herein in its entirety.

Figure 4A:
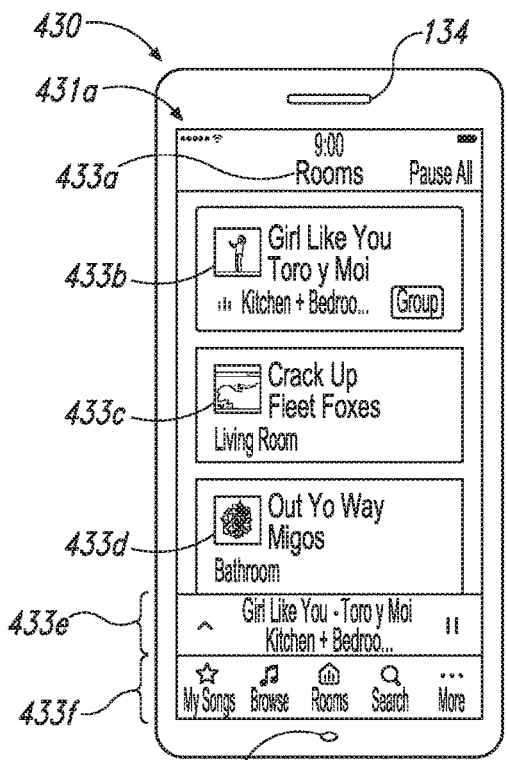
FIGS. 4A-4D are schematic diagrams of a control device in various stages of operation in accordance with aspects of the disclosed technology.
Figure 4B:
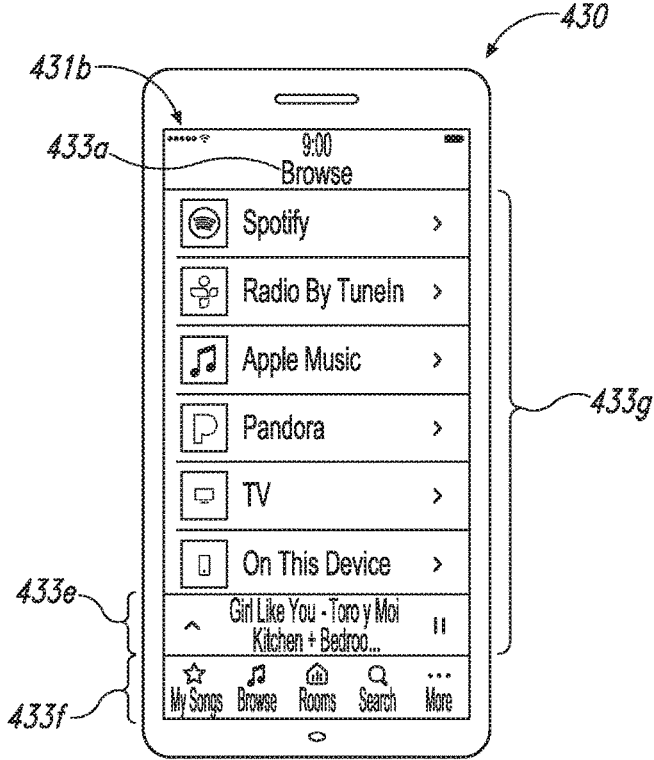
Figure 4C:
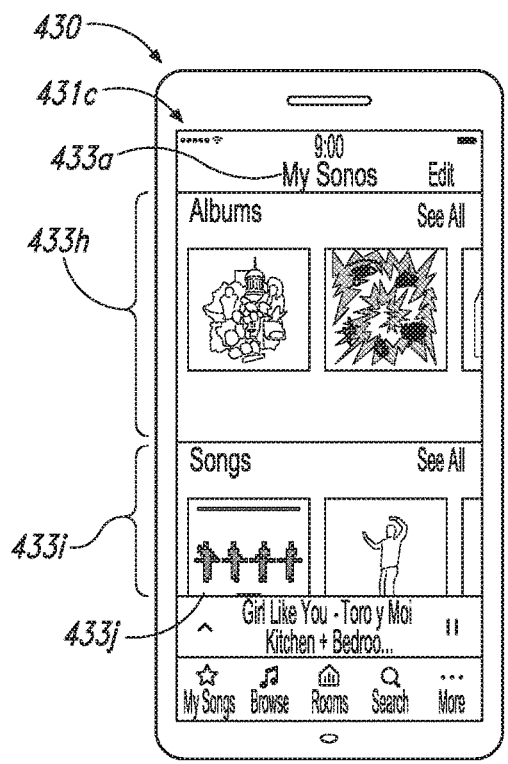
Figure 4D:
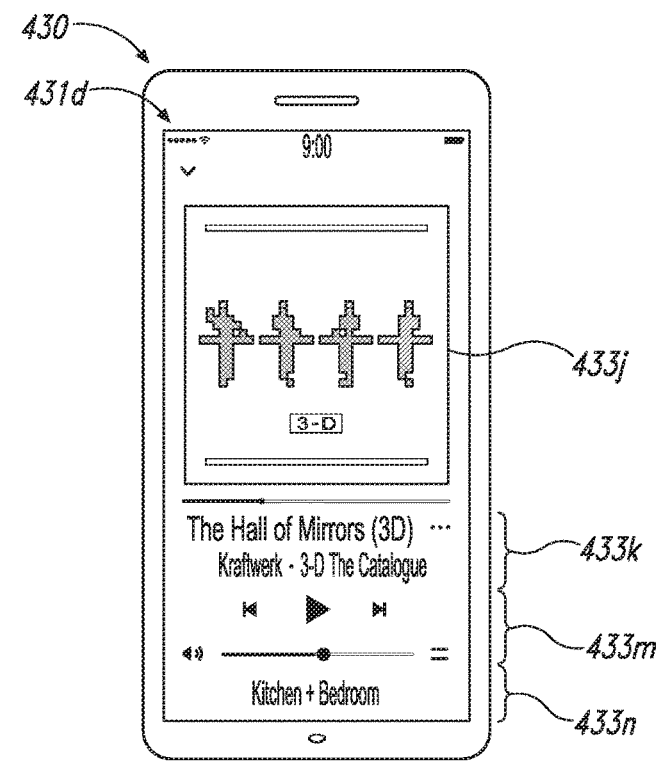

FIGS. 4A-4D are schematic diagrams of a control device 430 (e.g., the control device 130a of FIG. 1H, a smartphone, a tablet, a dedicated control device, an IoT device, and/or another suitable device) showing corresponding user interface displays in various states of operation. A first user interface display 431a (FIG. 4A) includes a display name 433a (i.e., "Rooms"). A selected group region 433b displays audio content information (e.g., artist name, track name, album art) of audio content played back in the selected group and/or zone. Group regions 433c and 433d display corresponding group and/or zone name, and audio content information audio content played back or next in a playback queue of the respective group or zone. An audio content region 433e includes information related to audio content in the selected group and/or zone (i.e., the group and/or zone indicated in the selected group region 433b). A lower display region 433f is configured to receive touch input to display one or more other user interface displays. For example, if a user selects "Browse" in the lower display region 433f, the control device 430 can be configured to output a second user interface display 431b (FIG. 4B) comprising a plurality of music services 433g (e.g., Spotify, Radio by Tunein, Apple Music, Pandora, Amazon, TV, local music, line-in) through which the user can browse and from which the user can select media content for play back via one or more playback devices (e.g., one of the playback devices 110 of FIG. 1A). Alternatively, if the user selects "My Sonos" in the lower display region 433f, the control device 430 can be configured to output a third user interface display 431c (FIG. 4C). A first media content region 433h can include graphical representations (e.g., album art) corresponding to individual albums, stations, or playlists. A second media content region 433i can include graphical representations (e.g., album art) corresponding to individual songs, tracks, or other media content. If the user selections a graphical representation 433j (FIG. 4C), the control device 430 can be configured to begin play back of audio content corresponding to the graphical representation 433j and output a fourth user interface display 431d fourth user interface display 431d includes an enlarged version of the graphical representation 433j, media content information 433k (e.g., track name, artist, album), transport controls 433m (e.g., play, previous, next, pause, volume), and indication 433n of the currently selected group and/or zone name.

Figure 5:
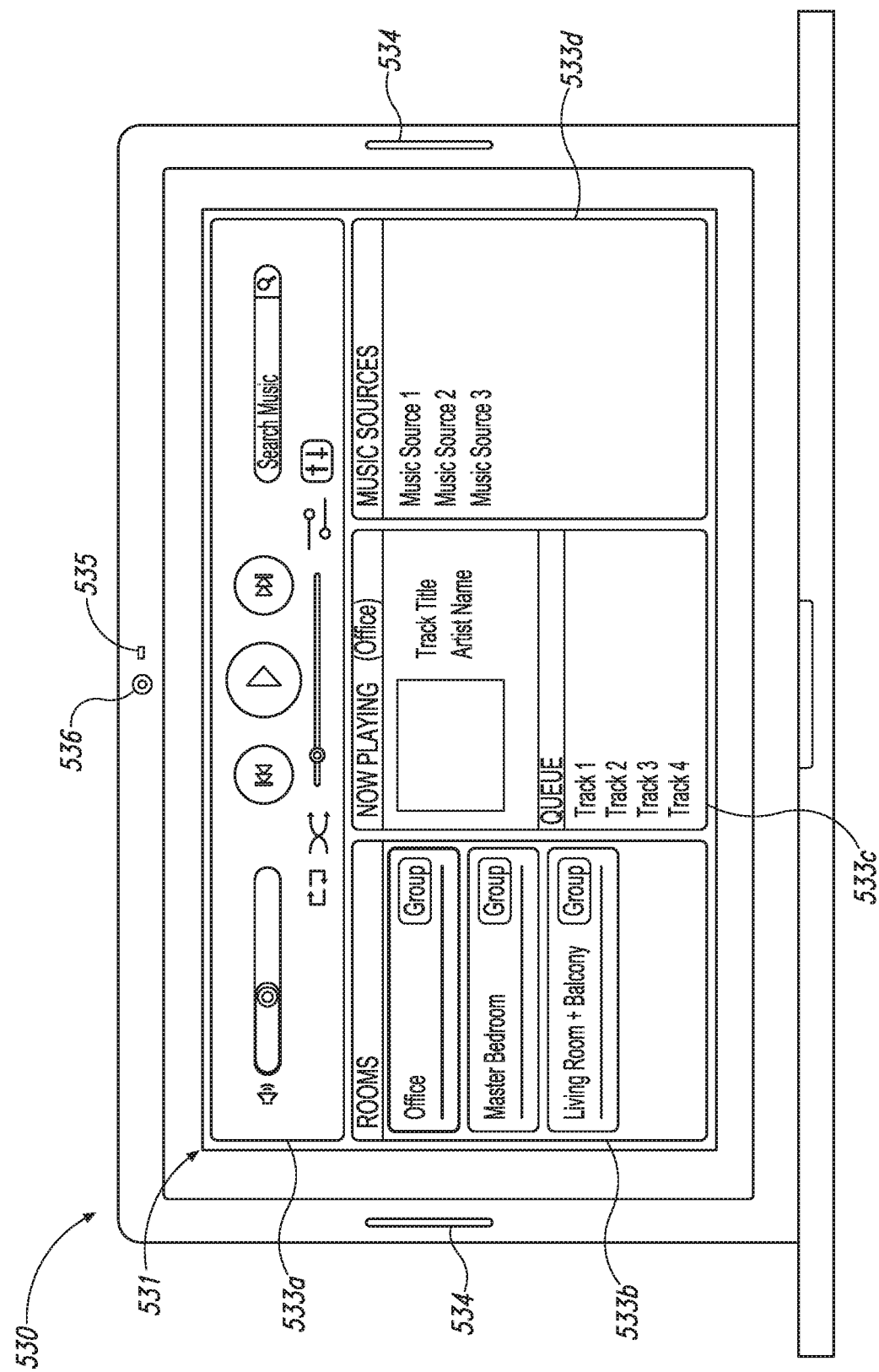
FIG. 5 is front view of a control device.

FIG. 5 is a schematic diagram of a control device 530 (e.g., a laptop computer, a desktop computer). The control device 530 includes transducers 534, a microphone 535, and a camera 536. A user interface 531 includes a transport control region 533a, a playback status region 533b, a playback zone region 533c, a playback queue region 533d, and a media content source region 533e. The transport control region comprises one or more controls for controlling media playback including, for example, volume, previous, play/pause, next, repeat, shuffle, track position, crossfade, equalization, etc. The audio content source region 533e includes a listing of one or more media content sources from which a user can select media items for play back and/or adding to a playback queue.

The playback zone region 533b can include representations of playback zones within the media playback system 100 (FIGS. 1A and 1B). In some embodiments, the graphical representations of playback zones may be selectable to bring up additional selectable icons to manage or configure the playback zones in the media playback system, such as a creation of bonded zones, creation of zone groups, separation of zone groups, renaming of zone groups, etc. In the illustrated embodiment, a "group" icon is provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone can be configured to play audio content in synchrony with the playback device(s) in the particular zone. Analogously, a "group" icon may be provided within a graphical representation of a zone group. In the illustrated embodiment, the "group" icon may be selectable to bring up options to deselect one or more zones in the zone group to be removed from the zone group. In some embodiments, the control device 530 includes other interactions and implementations for grouping and ungrouping zones via the user interface 531. In certain embodiments, the representations of playback zones in the playback zone region 533b can be dynamically updated as playback zone or zone group configurations are modified.

The playback status region 533c includes graphical representations of audio content that is presently being played, previously played, or scheduled to play next in the selected playback zone or zone group. The selected playback zone or zone group may be visually distinguished on the user interface, such as within the playback zone region 533b and/or the playback queue region 533d. The graphical representations may include track title, artist name, album name, album year, track length, and other relevant information that may be useful for the user to know when controlling the media playback system 100 via the user interface 531.

The playback queue region 533d includes graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device. In some embodiments, for example, a playlist can be added to a playback queue, in which information corresponding to each audio item in the playlist may be added to the playback queue. In some embodiments, audio items in a playback queue may be saved as a playlist. In certain embodiments, a playback queue may be empty, or populated but "not in use" when the playback zone or zone group is playing continuously streaming audio content, such as Internet radio that may continue to play until otherwise stopped, rather than discrete audio items that have playback durations. In some embodiments, a playback queue can include Internet radio and/or other streaming audio content items and be "in use" when the playback zone or zone group is playing those items.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped.

Figure 6:
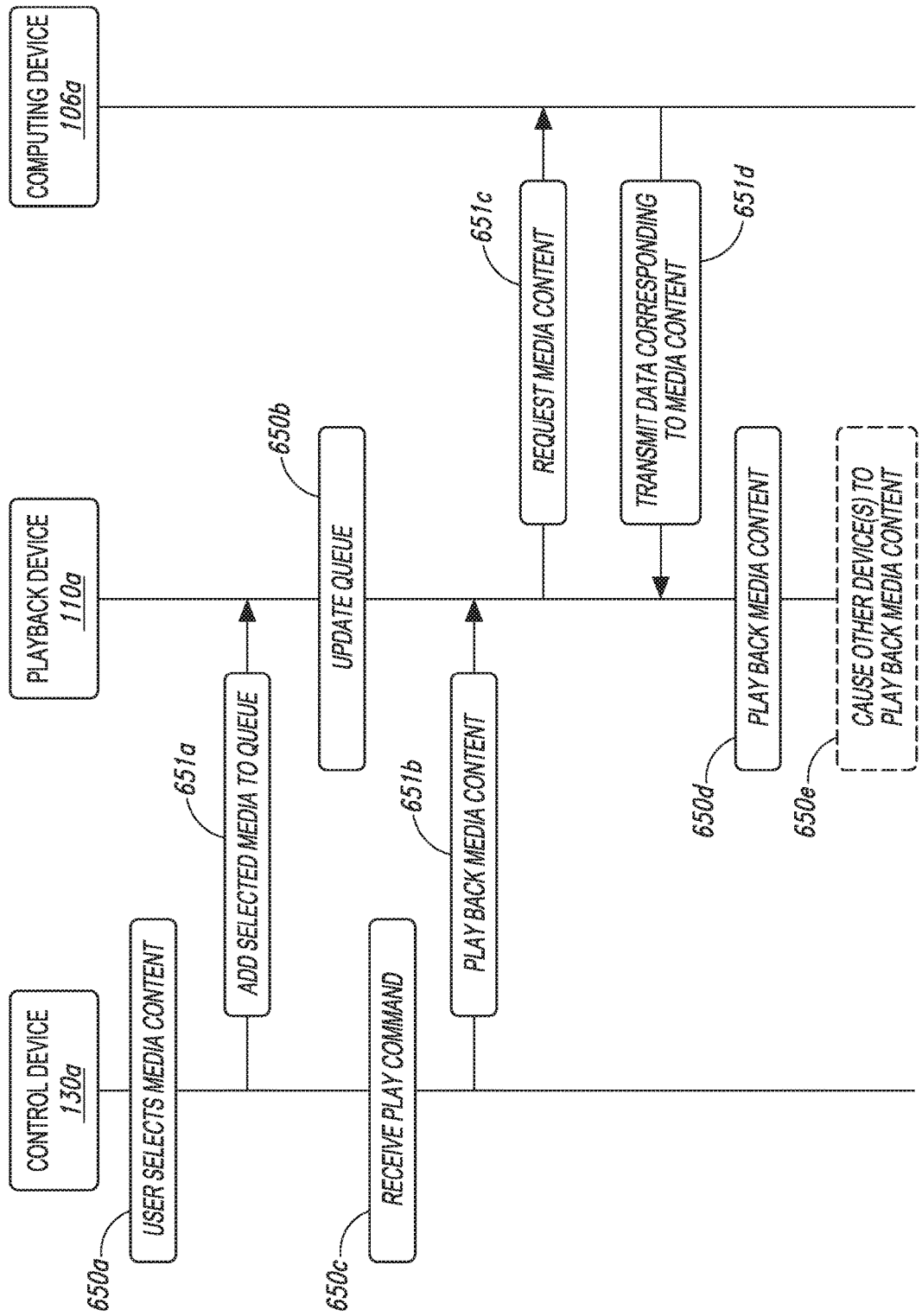
FIG. 6 is a message flow diagram of a media playback system.

FIG. 6 is a message flow diagram illustrating data exchanges between devices of the media playback system 100 (FIGS. 1A-1M).

At step 650a, the media playback system 100 receives an indication of selected media content (e.g., one or more songs, albums, playlists, podcasts, videos, stations) via the control device 130a. The selected media content can comprise, for example, media items stored locally on or more devices (e.g., the audio source 105 of FIG. 1C) connected to the media playback system and/or media items stored on one or more media service servers (one or more of the remote computing devices 106 of FIG. 1B). In response to receiving the indication of the selected media content, the control device 130a transmits a message 651a to the playback device 110a (FIGS. 1A-1C) to add the selected media content to a playback queue on the playback device 110a.

At step 650b, the playback device 110a receives the message 651a and adds the selected media content to the playback queue for play back.

At step 650c, the control device 130a receives input corresponding to a command to play back the selected media content. In response to receiving the input corresponding to the command to play back the selected media content, the control device 130a transmits a message 651b to the playback device 110a causing the playback device 110a to play back the selected media content. In response to receiving the message 651b, the playback device 110a transmits a message 651c to the computing device 106a requesting the selected media content. The computing device 106a, in response to receiving the message 651c, transmits a message 651d comprising data (e.g., audio data, video data, a URL, a URI) corresponding to the requested media content.

At step 650d, the playback device 110a receives the message 651d with the data corresponding to the requested media content and plays back the associated media content.

At step 650e, the playback device 110a optionally causes one or more other devices to play back the selected media content. In one example, the playback device 110a is one of a bonded zone of two or more players (FIG. 1M). The playback device 110a can receive the selected media content and transmit all or a portion of the media content to other devices in the bonded zone. In another example, the playback device 110a is a coordinator of a group and is configured to transmit and receive timing information from one or more other devices in the group. The other one or more devices in the group can receive the selected media content from the computing device 106a, and begin playback of the selected media content in response to a message from the playback device 110a such that all of the devices in the group play back the selected media content in synchrony.

IV. Example Configuration Methods

As described above, the embodiments disclosed and described herein address some of the particular technical challenges that arise when (i) configuring an individual media playback device and/or a media playback system comprising a plurality of media playback devices to interface with an audio source for audio format/playback and command/control interoperability and/or (ii) configuring an audio source to interface with an individual media playback device and/or media playback system comprising a plurality of media playback devices for audio format/playback and command/control interoperability.

For example, some embodiments are implemented in or as a playback device that includes (i) one or more processors, (ii) one or more network interfaces, and (iii) tangible, non-transitory computer-readable memory having instructions encoded therein, wherein the instructions, when executed by the one or more processors, cause the playback device to perform various functions. In some embodiments, the various functions performed by the playback device include receiving data from a display device connected to the playback device; sending a request for configuration instructions to a cloud computing system, wherein the request comprises the data received from the display device; and in response to sending the data received from the display device to the cloud computing system, receiving configuration instructions from the cloud computing system, wherein the configuration instructions are associated with the display device connected to the playback device.

Other embodiments are implemented in or as a cloud computing system that includes (i) one or more processors, (ii) one or more network interfaces, and (iii) tangible, non-transitory computer-readable memory having instructions encoded therein, wherein the instructions, when executed by the one or more processors, cause the playback device to perform various functions. In some embodiments, the various functions performed by the cloud computing system include storing a plurality of correlations between display device identification data and corresponding configuration instructions in the tangible, non-transitory computer-readable media; receiving a request for configuration instructions from a playback device, wherein the request comprises data that the playback device received from a display device; in response to receiving the request for configuration instructions from the playback device, determining whether the plurality of correlations includes configuration instructions corresponding to the data in the request; and in response to determining that the plurality of correlations includes configuration instructions corresponding to the data in the request, transmitting the configuration instructions corresponding to the data in the request to the playback device that sent the request.

Figure 7:
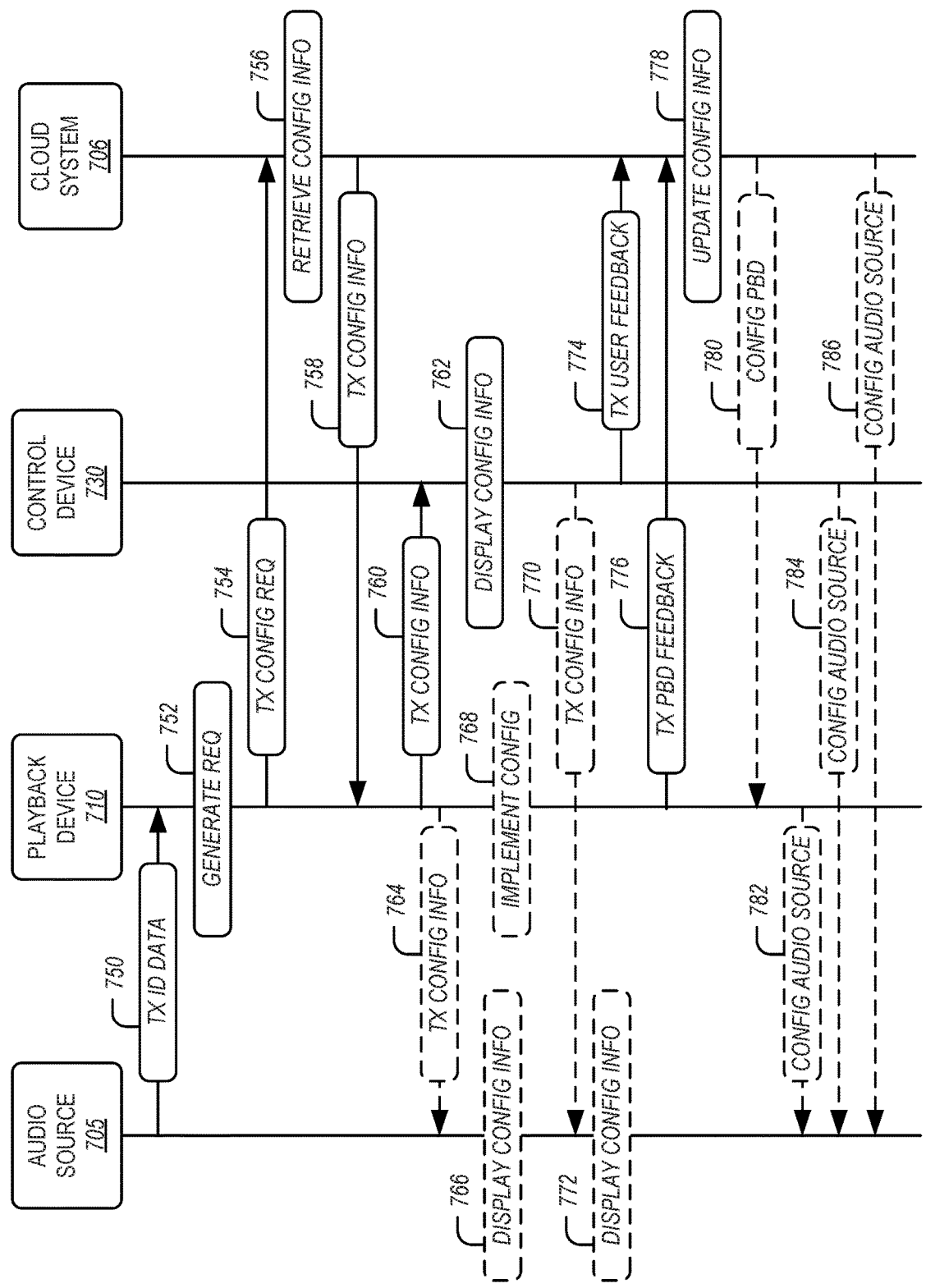
FIG. 7 is a message flow diagram illustrating data exchanges between an audio source, playback device, cloud computing system, and control device to implement the configuration functions disclosed and described herein according to some embodiments.

FIG. 7 is a message flow diagram illustrating data exchanges between an audio source 705, playback device 710, cloud computing system 706, and control device 730 to implement the configuration functions disclosed and described herein according to some embodiments.

At step 750, audio source 705 transmits data that is received by the playback device 710. In some embodiments, the audio source 705 is one of a television, "smart" television, Blu-ray player, DVD player, media server, set-top box (e.g., a cable box, AppleTV®, Roku®, etc.), or video projector, and the playback device 710 is the same as or similar to any of the playback devices disclosed and described herein. In some embodiments, the playback device 710 is a networked microphone device. In some embodiments, the playback device 710 is a soundbar devices, e.g., a SONOS, Inc. "PLAYBAR" or "PLAYBASE" or any other type of soundbar. In some embodiments, the playback device 710 is one of a plurality of playback devices in a media playback system such as media playback system 100.

In operation, the audio source 705 is connected to the playback device 710 via a wired or wireless connection. In some embodiments, the audio source 705 is connected to the playback device 710 via a wired connection, such as a High-Definition Multimedia Interface (HDMI) connection, and in such embodiments, the playback device 710 receives the data from the audio source 705 via the HDMI connection between the audio source 705 and the playback device 710. However, other types of connections could be used, too, such as an optical audio connection, Sony/Philips Digital Interface Format (S/PDIF) connection, a Toshiba Link (TOSLINK) connection, Ethernet connection, WiFi wireless link, or any other wired or wireless connection now known or later developed.

In some embodiments, the playback device 710 is a soundbar, the audio source 705 is a television, "smart" television, or other display device, the audio source 705 (display device) is connected to the playback device 710 via an HDMI connection, and the data that the playback device 710 receives from the audio source 705 (display device) via the HDMI connection at step 750 includes Extended Display Data (EDID) from the audio source 705 (display device).

In operation, the EDID data comprises one or more of the manufacturer name, serial number, product type, phosphor or filter type, timings supported by the display, display size, luminance data and (for digital displays) pixel mapping data, and perhaps other data about the audio source 705. In some embodiments, the data received by the playback device 710 at step 750 may additionally or alternatively include other data (different from EDID) that can be used to identify one or more attributes of the audio source 705.

After receiving the data at step 750, the playback device 710 generates a request for configuration information at step 752. In some embodiments, the configuration information request includes at least a portion of the data received at step 750, e.g., at least a portion of EDID data received at step 750. In some embodiments, the configuration information request is based on the data received at step 750, but the configuration information request need not necessarily include any portion of the data received at step 750. In some embodiments, the playback device 710 forwards the EDID data received from the audio source 705 to the cloud system 706.

In some embodiments, the configuration information request includes one or both of (i) a request for configuration information for configuring the playback device 710 and/or (ii) a request for configuration information for configuring the audio source 705. In some embodiments, the configuration information request comprises information about the particular model of playback device, such as the model/product number of the playback device, the hardware and current software version of the playback device, and current configuration details of the playback device, such as whether the playback device is in a synchrony group, whether the playback device is in a bonded group, whether the playback device is in a group of playback devices configured for surround sound playback, and perhaps of other playback device configuration details. In some embodiments, the configuration information request includes information about a synchrony group in which the playback device is configured to operate, such as how many playback devices are in the synchrony group, whether the synchrony group is configured (or capable) to provide surround sound, and if so, the surround sound formats supported by the synchrony group (and the playback devices in the synchrony group). In some embodiments, the configuration information request includes information about whether the playback device is configured (or at least capable of being configured) to receive and process voice control commands.

However, in some embodiments where the playback device 710 is registered with the cloud system 706 and the cloud system 706 already has a record of the playback device 710 configuration settings, the configuration information request need not include configuration information for the playback device 710.

After generating configuration information request at step 752, the playback device 710 transmits the configuration information request to a cloud system 706 at step 754. In operation, the cloud system 706 may be similar to or the same as any of the cloud computing systems disclosed and described herein, including but not limited to any one or more of cloud computing devices 106*a-c*. In some embodiments, the playback device 710 transmits the confirmation information request to the cloud system 706 via one or more networks, such as a local area network, a wide area network, and/or the Internet.

In some embodiments, the cloud computing system includes, or at least has access to, a database of playback device configuration information and audio source device configuration information. This database of playback device configuration information and audio source device configuration information is referred to herein as a configuration information database. This configuration information database includes configuration information for configuring audio settings, control channel signaling settings, infrared remote control settings, and/or voice control settings for many different types of audio source devices from many different audio source device manufacturers in many different deployment scenarios (e.g., standalone television, television with set-top box, television with Blu-ray or DVD player, television connected to video media server, and so on). In some embodiments, the configuration information database also includes configuration information for configuring audio settings, control channel signaling settings, infrared remote control settings, and/or voice control settings for multiple types of playback devices in many different deployment scenarios (e.g., standalone, stereo pair, bonded player, synchrony group, surround sound, and so on). In some embodiments, the configuration information database additionally or alternatively includes troubleshooting instructions associated with configuring playback devices and/or audio sources.

Examples of configuration information for an audio source (e.g., a display device) include (i) human-readable instructions for configuring one or more audio input/output settings for the audio source, e.g., instructions for configuring the audio source to output particular audio formats (for example, mono, stereo, multi-channel surround sound), (ii) human-readable instructions for configuring one or more control channel settings for the audio source, e.g., instructions for configuring Consumer Electronics Control (CEC) features for sending and receiving control information via an HDMI connection, (iii) computer-executable instructions for configuring one or more audio input/output settings for the audio source, including one or more of instructions executable by the audio source to configure one or more audio settings, instructions executable by the playback device to configure one or more audio settings of the audio source, instructions executable by a controller device to configure one or more audio settings of the audio source, and/or instructions executable by the cloud system to configure one or more audio settings of the audio source, (iv) computer-executable instructions for configuring one or more control channel settings for the audio source, including one or more of instructions executable by the audio source to configure one or more control channel settings, instructions executable by the playback device to configure one or more control channel settings for the audio source, instructions executable by a controller device to configure one or more control channel settings for the audio source, and/or instructions executable by the cloud system to configure one or more control channel settings for the audio source, (v) human-readable instructions for configuring one or more microphone settings of the audio source device and/or playback device, e.g., instructions for configuring one or more microphones of the audio source device and/or playback device for receiving voice commands, and (vi) computer-executable instructions for configuring one or more microphone settings for the audio source, e.g., instructions executable by the audio source to configure one or more of its own microphones, instructions executable by the playback device to configure one or more microphones of the audio source, instructions executable by a controller device to configure one or more microphones of the audio source, and/or instructions executable by the cloud system to configure one or more microphones of the audio source.

In some embodiments, instructions for configuring one or more microphones of the audio source 705 may include instructions for disabling the one or more microphones or perhaps disabling or deactivating a voice control feature of the audio source to prevent conflicts that may arise from either (i) simultaneously using a first voice control feature on the audio source 705 and a second voice control feature on the playback device 710, or (ii) simultaneously using the same voice control feature on both the audio source 705 and the playback device 710. In some embodiments, instructions for configuring one or more microphones of the audio source 705 may include instructions for configuring the microphone(s) and voice control subsystems of the audio source 705 to operate cooperatively with one or more microphones and voice control subsystems of the playback device 710.

Examples of configuration information for a playback device (or perhaps a group of playback devices configured in a synchrony group, e.g., to provide surround sound playback) include (i) human-readable instructions for configuring one or more audio input/output settings for the playback device (individually or with one or more other playback devices in a synchrony group), e.g., instructions for configuring the playback device(s) to output particular audio formats (for example, mono, stereo, multi-channel surround sound), (ii) human-readable instructions for configuring one or more control channel settings for the playback device (individually or with one or more other playback devices in a synchrony group), e.g., instructions for configuring Consumer Electronics Control (CEC) features for sending and receiving control information via an HDMI connection, (iii) computer-executable instructions for configuring one or more audio input/output settings for the playback device (individually or with one or more other playback devices in a synchrony group), including instructions executable by the playback device (individually or with one or more other playback devices in a synchrony group) to configure one or more audio settings, instructions executable by a controller device to configure one or more audio settings of the playback device (individually or with one or more other playback devices in a synchrony group), and/or instructions executable by the cloud system to configure one or more audio settings of the playback device (individually or with one or more other playback devices in a synchrony group), (iv) computer-executable instructions for configuring one or more control channel settings for the playback device (individually or with one or more other playback devices in a synchrony group), e.g., instructions executable by the playback device (individually or with one or more other playback devices in a synchrony group) to configure one or more control channel settings, instructions executable by a controller device to configure one or more control channel settings for the playback device (individually or with one or more other playback devices in a synchrony group), and/or instructions executable by the cloud system to configure one or more control channel settings for the playback device (individually or with one or more other playback devices in a synchrony group), (v) human-readable instructions for configuring one or more microphone settings of the playback device (individually or with one or more other playback devices in a synchrony group), e.g., settings for microphones configured to receive voice commands, and (vi) computer-executable instructions for configuring one or more microphone settings for the playback device (individually or with one or more other playback devices in a synchrony group), e.g., instructions executable by the playback device (individually or with one or more other playback devices in a synchrony group) to configure one or more of its own microphones, instructions executable by a controller device to configure one or more microphones of the playback device (individually or with one or more other playback devices in a synchrony group), and/or instructions executable by the cloud system to configure one or more microphones of the playback device (individually or with one or more other playback devices in a synchrony group).

In some embodiments, instructions for configuring one or more microphones of the playback device 710 may include instructions for disabling the one or more microphones or perhaps disabling or deactivating a voice control feature of the playback device to prevent conflicts that may arise from either (i) simultaneously using a first voice control feature on the audio source 705 and a second voice control feature on the playback device 710, or (ii) simultaneously using the same voice control feature on both the audio source 705 and the playback device 710. In some embodiments, instructions for configuring one or more microphones of the playback device 710 may include instructions for configuring the microphone(s) and voice control subsystems of the playback device 710 to operate cooperatively with one or more microphones and voice control subsystems of the audio source 705.

In some embodiments, the cloud system 706 uses information contained within the configuration information request received in step 754 to retrieve any of the above-described configuration information from the configuration information database.

For example, in embodiments where the audio source 705 is a display device that transmits EDID data to the playback device 710 via an HDMI connection between the audio source 705 and playback device 710 at step 750, and the playback device 710 generates a configuration information request comprising at least a portion of the EDID data at step 752 and then transmits that configuration information request comprising the received EDID data to the cloud system 706 at step 754, the cloud system 706 uses the EDID data (or perhaps a portion thereof) in the configuration information request received from the playback device 710 to retrieve configuration information from the configuration information database at stop 756.

As described earlier, the EDID data includes one or more of the manufacturer name, serial number, product type, and perhaps other data about the audio source 705, e.g., hardware version, software version, etc. Because the configuration information database includes configuration information for many different types of audio source devices from many different audio source device manufacturers as described above, and because the EDID data comprises one or more of the manufacturer name, serial number, and product type, the cloud system 106 can use the EDID data in the configuration information request to lookup and retrieve configuration information for the specific audio source device corresponding to the EDID data contained in the configuration information request.

Similarly, in embodiments where the configuration information request additionally comprises information about the particular model and configuration (e.g., standalone, stereo pair, surround sound, etc.) of playback device 710 that sent the configuration information request at step 754, or if the cloud system 706 already has a record of the playback device 710's configuration settings, the cloud system 706 uses the information about the particular model and configuration of the playback device to additionally lookup configuration information for one or both of (i) the specific playback device 710 that sent the configuration information request at step 754, and/or (ii) one or more additional playback devices communicatively coupled to the playback device 710, at least in configurations where the playback device 710 is a member of a stereo pair, consolidated playback device, bonded playback device, surround sound group, synchrony group, and/or other type of grouping of playback devices.

After the cloud system 706 retrieves the configuration information from the configuration information database at step 756, the cloud system 706 transmits the configuration information retrieved at step 756 to the playback device 710 at step 758. The configuration information is any of the configuration information contained in the configuration information database, e.g., instructions for configuring audio formats, control channels, infrared remote commands, and/or microphone settings of one or both of a playback device and/or audio source. And after the playback device 710 receives the configuration information from the cloud system 706 at step 758, the playback device 710 can perform one or more functions with the received configuration information.

The configuration information in some instances may additionally include playback device 710 specific and/or audio source 705 specific troubleshooting instructions to help a user troubleshoot known configuration problems or challenges with specific playback device configurations and/or specific audio source models/versions from specific manufacturers. For example, the troubleshooting instructions could inform a user that 5.1 surround sound is available from the specific audio source 705, but that the playback device 710 is not receiving surround sound formatted audio content from the audio source 705 along with instructions for enabling or otherwise configuring the audio settings of the audio source 705 to transmit surround sound formatted audio content to the playback device 710. In another example, if a specific audio source model/version is known to implement certain control signaling features in a way that causes conflicts with the playback device 710 (e.g., auto power polling, topology scanning, or other HDMI CEC features), then the troubleshooting instructions could instructions for disabling those specific conflicting features on the audio source 705. In some embodiments, rather than (or perhaps in addition to) providing the troubleshooting information, the configuration information could include computer executable instructions for configuring one or both of the playback device 710 and/or audio source 705 to eliminate or at least ameliorate the configuration issues that the user would have otherwise needed to address by following the troubleshooting instructions.

In some embodiments, the playback device 710 transmits the configuration information (or at least a portion thereof) to control device 730 at step 760. The control device 730 is the same as or similar to any of the control devices and/or controllers disclosed and described herein, including but not limited to control devices 130*a* and 130*b*.

In some embodiments, after receiving the configuration information (or at least a portion thereof) from the playback device 710, the control device 730 displays the configuration information (or at least a portion thereof) to a user via a user interface screen of the control device 730 at step 762. The user interface screen is the same as or similar to any of the user interface screens disclosed and described herein, including but not limited to screen 133.

Displaying the configuration information for one or both of the playback device 710 and the audio source 705 enables a user to follow configuration and/or troubleshooting instructions that are specific to one or more of (i) the particular make/model/version of the audio source 705, and (ii) the particular model and configuration of the playback device 710. With the benefit of audio source specific configuration and/or troubleshooting instructions (individually or in combination with playback device specific and playback device configuration specific configuration instructions) provided by the cloud system 706, configuring the audio source 705 to interoperate with the playback device 710 is far easier, quicker, and less error-prone compared to existing methods that rely on generic instructions or online research conducted by a user. Further, providing audio source specific configuration and/or troubleshooting instructions (individually or in combination with playback device specific and playback device configuration specific configuration instructions) from the cloud system 706 should reduce the likelihood that a user will need a professional audio/video system installer to setup and configure the audio source 705 and/or playback device 710 or that a user will need to call a customer support hotline or open a trouble ticket with the audio source 705 or playback device 710 manufacturer.

In some embodiments, the playback device 710 additionally or alternatively transmits the configuration information (or at least a portion thereof) to audio source 705 at step 764. And after receiving the configuration information (or at least a portion thereof) from the playback device 710 at step 764, the audio source 705 displays the configuration information (or at least a portion thereof) via a screen or display integrated or associated with the audio source 705. For example, if the audio source 705 is a type of television, displaying the configuration information (or least a portion of the configuration information) at step 766 includes displaying configuration information on the screen of the television. Alternatively, in some embodiments, the control device 730 transmits configuration information to the audio source 705 at step 770, and the audio source 705 then displays the configuration information (or at least a portion thereof) via a screen or display integrated or associated with the audio source 705 at step 772.

In some embodiments, when the playback device 710 receives configuration information at step 758 that includes computer-executable configuration instructions, the playback device 710 additionally or alternatively implements the computer-executable instructions (or a least a portion thereof) at step 768. For example, in a scenario where the audio source 705 (e.g., a television) can output 5.1 surround sound and the playback device 710 (e.g., a soundbar) can process 5.1 surround sound for playback individually and/or in combination with one or more additional playback devices, then implementing the computer-executable configuration instructions includes the playback device 710 configuring itself (and perhaps one or more additional playback devices in communication with the playback device 710) to process and/or playback 5.1 surround sound.

Additionally or alternatively, in a scenario where the audio source 705 supports a particular type of control signaling protocol (e.g., Consumer Electronics Control (CEC) protocol, any manufacturer-proprietary CEC variants (e.g., Anynet+, Aquos Link, BRAVIA, CE-Link, EasyLink, HDMI-CEC, Kuro Link, SimpLink, etc.), or other signaling and control protocol(s)), then implementing the computer-executable configuration instructions at step 768 includes the playback device 710 configuring itself to transmit/receive/process control signaling and/or command messages/instructions according to the same control signaling protocol as the audio source 705.

Similarly, in a scenario where the audio source 705 is controlled by an infrared remote control, implementing the computer-executable configuration instructions additionally or alternatively includes the playback device 710 configuring itself to receive/process control signaling and/or command messages/instructions according to the same infrared remote control instruction set as the audio source 705 so that a user can control the playback device 710 with the audio source's remote control, i.e., the remote control for audio source 705. For example, configuring the playback device 710 to receive/process control signaling and/or command messages/instructions according to the same infrared remote control instruction set as the audio source 705 allows a user to power on/off, mute, and control the volume of the playback device 710 (and perhaps perform additional control functions, too) using the audio source's remote control.

After the control device 730 (or another device) displays the configuration instructions (or a least a portion thereof) to a user at step 762, and after the user has implemented at least some of the configuration instructions on one or both of the audio source 705 and the playback device 710, some embodiments include providing feedback to the cloud system 706 about whether the user was able to successfully configure the playback device 710 and/or audio source 705 by following the configuration instructions. In some embodiments, the user enters feedback via the control device 730 on whether he or she was able to successfully configure the playback device 710 and/or audio source 705, and then the control device 730 transmits the user feedback to the cloud system 706 at step 774, and the cloud system 706 updates the configuration information accordingly at step 778.

For example, if the user feedback confirms that the user was able to successfully configure one or both of the playback device 710 and/or the audio source 705 by following the configuration instructions, then the cloud system 706 updating the configuration information at step 778 includes the cloud system 706 storing an indication of the successful configuration for the configuration instructions associated with the type of audio source 705 and/or playback device 710. Similarly, if the user feedback indicates that the user was not able to successfully configure one or both of the playback device 710 and/or the audio source 705 by following the configuration instructions, then the cloud system 706 updating the configuration information at step 778 includes the cloud system 706 storing an indication of the unsuccessful configuration for the configuration instructions. In some instances, the user feedback may additionally include alternative instructions or deviations from the configuration instructions that resulted in the user successfully configuring one or both of the playback device 710 and/or audio source 705.

In some embodiments, the playback device 710 transmits feedback directly to the cloud system, as shown in step 776. In operation, after a user has implemented the configuration instructions displayed at any of steps 762, 776, or 772, or perhaps after the playback device 710 has implemented the configuration instructions at step 768, the playback device 710 executes a testing routine to determine whether it can successfully receive audio content from the audio source and send/receive control commands via the control channel. For example, for some embodiments where the playback device 710 is connected to the audio source 705 via an HDMI connection that implements HDMI Audio Return Channel (ARC), the playback device 710 can transmit audio content to the audio source 705 via the ARC to see if the audio source 705 returns the same format/quality audio content back to the playback device 710 to confirm whether the audio configuration settings of the playback device 710 (and perhaps the audio source 705) are configured as intended or expected. Similarly, the playback device 710 can transmit CEC commands to the audio source 705 or exchange other CEC messaging with the audio source 705 to confirm whether the control/command signaling settings of the playback device 710 (and perhaps the audio source 705) are configured as intended or expected.

After performing one or more of the testing routines described above, or perhaps performing other testing routines, the playback device 710 in some embodiments transmits feedback relating to the outcome of the testing routines to the cloud system 706.

Regardless of whether the control device 730 sends user feedback to the cloud system (step 774) or the playback device 710 sends playback device feedback to the cloud system 706 (step 776), updating the configuration information with (or perhaps based on) feedback allows the operator of the cloud system to improve the quality of the configuration information stored in the configuration information database.

In some embodiments, rather than (or perhaps in addition to) the cloud system 706 transmitting the configuration information to the playback device 710 at step 758, the cloud system 706 additionally or alternatively (i) directly configures the playback device 780 at step 780 and/or (ii) directly configures the audio source 705 at step 786. Similarly, in some embodiments, rather than (or perhaps in addition to) the playback device 710 transmitting the configuration information to the control device 730 at step 760 for display to a user at step 762, the playback device 710 additionally or alternatively directly configures the audio source 705 at step 782. And in some embodiments, rather than (or perhaps in addition to) the control device 730 displaying configuration instructions to a user at step 762, the control device 730 additionally or alternatively directly configures the audio source 705 at step 784.

By directly configuring one or both of the playback device 710 and/or audio source 705, the cloud computing system 706 remotely configures the playback device 710 and/or audio source 705 preferably without requiring further actions by the user. Direct configuration of the playback device 710 by the cloud system 706 is possible in scenarios where one or both of (i) the playback device 710 manufacturer operates the cloud system 706 and/or (ii) the playback device 710 manufacturer has made available an application programming interface (API) that allows remote software programs (e.g., remote configuration problems implemented by the cloud system 706) to set configuration parameters of the playback device 710. Similarly, direct configuration of the audio source 705 by the cloud system 706, playback device 710, and/or playback device 710 is possible in scenarios where one or both (i) the audio source 705 manufacturer operates the cloud system 706, (ii) the audio source 705 manufacturer and playback device 710 manufacturer are the same, and/or (iii) the audio source 705 manufacturer has made available an application programming interface (API) that allows remote software programs (e.g., remote configuration problems implemented by the cloud system 706, playback device 710, or control device 730 to set configuration parameters of the audio source 705.

Figure 8:
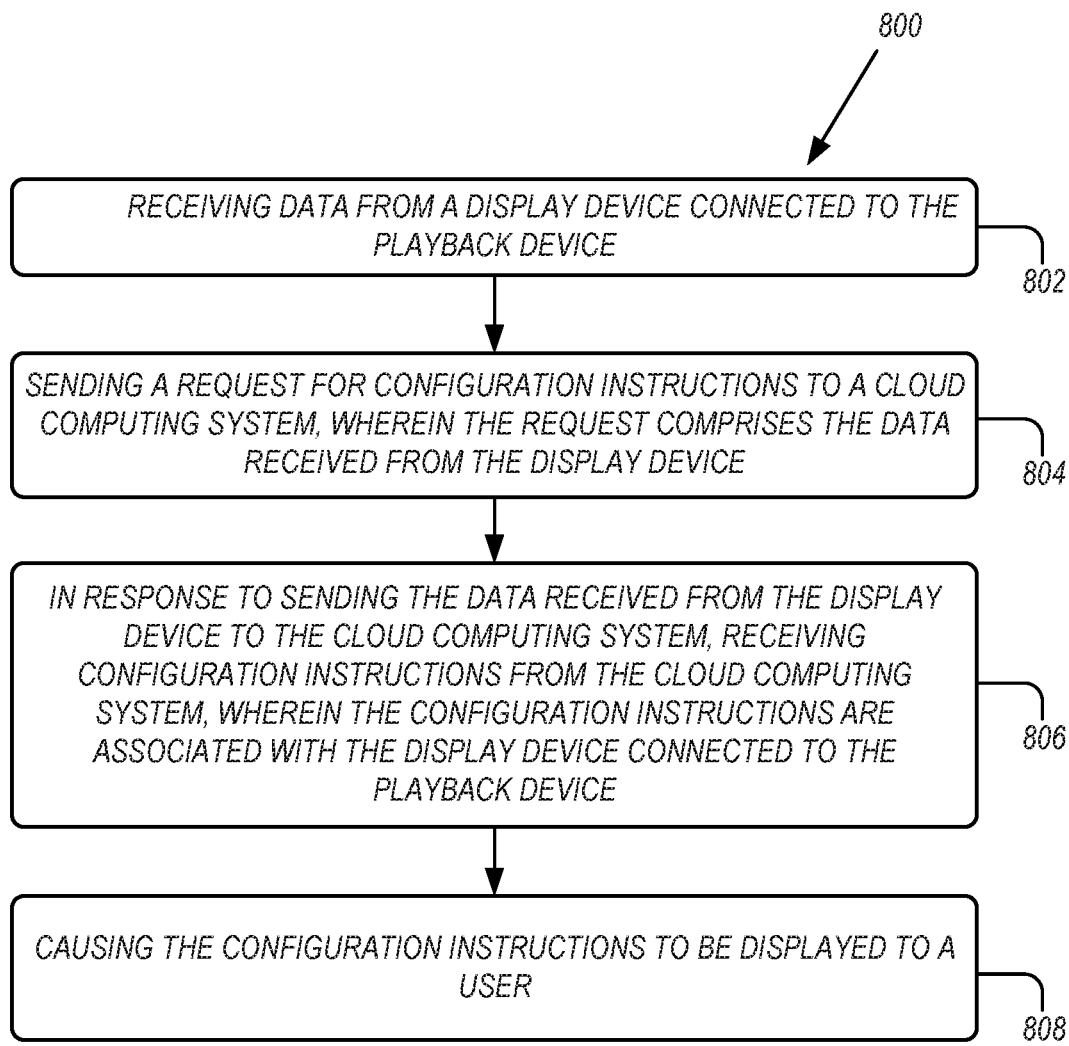
FIG. 8 is a configuration method performed by a playback device according to some embodiments.

FIG. 8 is a configuration method 800 performed by a playback device according to some embodiments.

Method 800 begins at block 802, which includes receiving data from a display device connected to the playback device. In some embodiments, receiving data from the display device connected to the playback device comprises receiving data from the display device via a High-Definition Multimedia Interface (HDMI) connection between the display device and the playback device. In some embodiments, receiving data from the display device connected to the playback device comprises receiving Extended Display Data (EDID) from the display device.

In some embodiments, the playback device is the same as similar to any of the playback devices disclosed and described herein. In some embodiments the playback device is a soundbar. In some embodiments, the display device is similar to or the same as any of the audio source devices (e.g., audio source 705) disclosed and described herein. In some embodiments, the display device is a television.

Next, method 800 advances to block 804, which includes sending a request for configuration instructions to a cloud computing system, wherein the request comprises at least a portion of the data received from the display device.

Next, method 800 advances to block 806, which includes in response to sending the data received from the display device to the cloud computing system, receiving configuration instructions from the cloud computing system, wherein the configuration instructions are associated with the display device connected to the playback device. In some embodiments, the configuration instructions include any one or more of (i) instructions for configuring at least one audio and/or control signaling feature on one or both of the playback device and the display device; (ii) instructions for troubleshooting one or more configuration settings for one or both of the playback device and the display device.

Next, method 800 advances to block 808, which includes causing the configuration instructions to be displayed to a user. In some embodiments, causing at least a portion of the configuration instructions to be displayed to a user comprises sending at least a portion of the configuration instructions to a controller device via one of the one or more network interfaces, wherein the controller device is separate from the playback device. In some embodiments, causing at least a portion of the configuration instructions to be displayed to a user comprises sending at least a portion of the configuration instructions to the display device.

In some embodiments, method 800 additionally includes in response to receiving configuration instructions from the cloud computing system, (i) configuring at least one setting of the playback device according to the configuration instructions, and (ii) configuring at least one setting of the at least one other playback device according to the configuration instructions. In some embodiments, method 800 additionally includes in response to receiving configuration instructions from the cloud computing system, configuring at least one setting of the display device according to the configuration instructions. And in some embodiments, method 800 additionally includes receiving feedback on whether execution of the configuration instructions was successful, and in response to receiving the feedback, transmitting a feedback message to the cloud computing server comprising an indication of the feedback.

Figure 9:
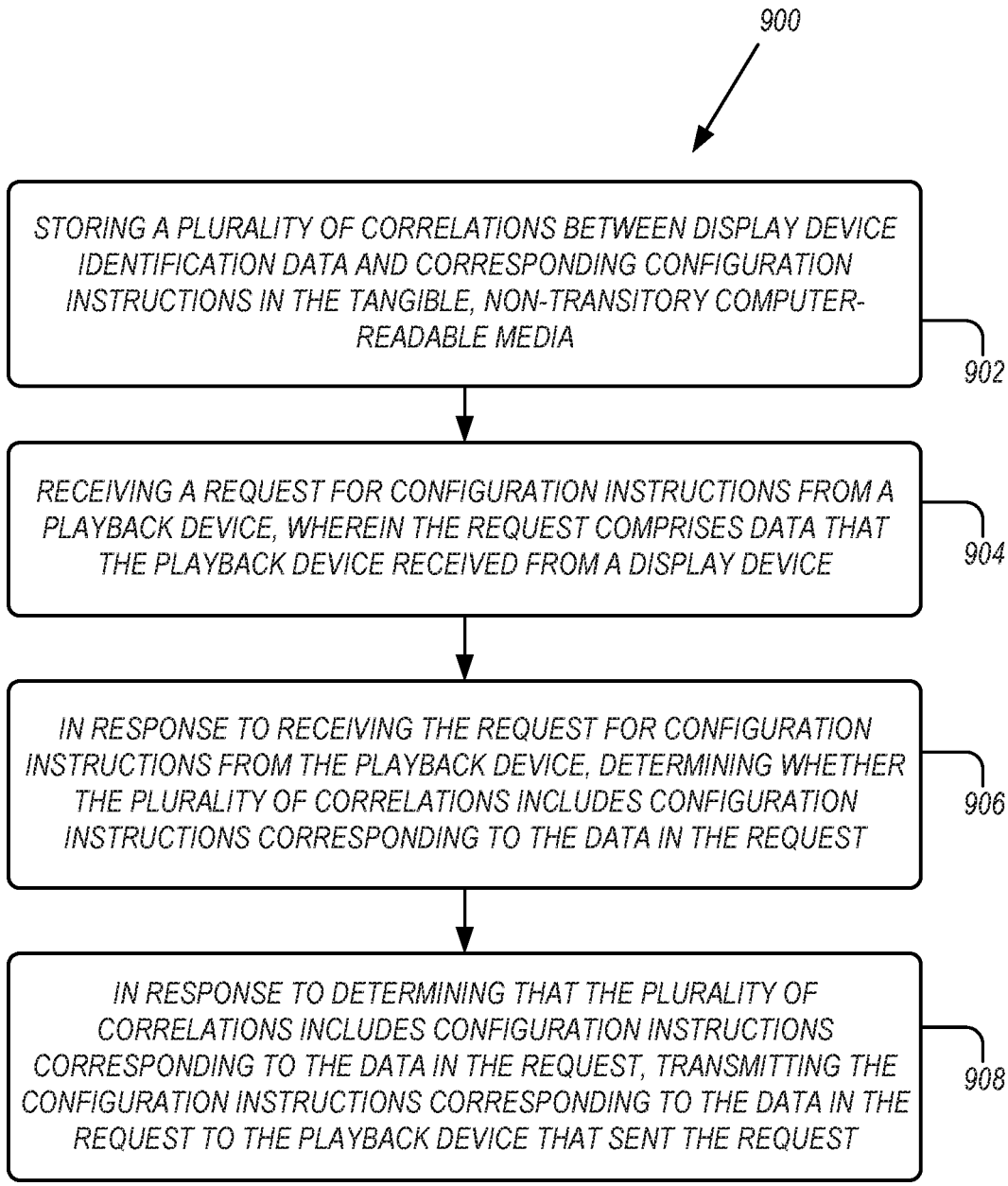
FIG. 9 is a configuration method performed by a cloud computing system according to some embodiments.

FIG. 9 is a configuration method 900 performed by a cloud computing system according to some embodiments.

In some embodiments, the playback device is the same as similar to any of the playback devices disclosed and described herein. In some embodiments the playback device is a soundbar. In some embodiments, the cloud computing system is similar to or the same as any of the cloud computing systems disclosed and described herein.

Method 900 begins at block 902, which includes storing a plurality of correlations between display device identification data and corresponding configuration instructions in the tangible, non-transitory computer-readable media. In operation, the configuration instructions include any of the human-readable or computer-executable configuration instructions for any of the playback devices and/or any of the display devices or audio sources disclosed and described herein.

Next, method 900 advances to block 904, which includes receiving a request for configuration instructions from a playback device, wherein the request comprises data that the playback device received from a display device. In some embodiments, the request received from the playback device comprises Extended Display Data (EDID) that the playback device received from the display device.

Next, method 900 advances to block 906, which includes in response to receiving the request for configuration instructions from the playback device, determining whether the plurality of correlations includes configuration instructions corresponding to the data in the request; and Next, method 900 advances to block 908, which includes in response to determining that the plurality of correlations includes configuration instructions corresponding to the data in the request, transmitting the configuration instructions corresponding to the data in the request to the playback device that sent the request. In some embodiments, the configuration instructions comprise instructions for configuring at least one High-Definition Multimedia Interface (HDMI) Consumer Electronics Control (CEC) feature on one or both of the playback device and the display device. In some embodiments, the configuration instructions comprise instructions for configuring at least one audio feature on one or both of the playback device and the display device. In some embodiments, the configuration instructions comprise instructions for troubleshooting at least one configuration setting on one or both of the playback device and the display device.

In some embodiments, transmitting the configuration instructions corresponding to the data in the request to the playback device that sent the request comprises configuring the playback device according to the configuration instructions.

In some embodiments, the playback device is in a synchrony group with at least one other playback device, and wherein transmitting the configuration instructions corresponding to the data in the request to the playback device that sent the request comprises (i) configuring the playback device according to the configuration instructions, and (ii) configuring the at least one other playback device according to the configuration instructions.

In some embodiments, method 900 additionally includes receiving a feedback message from the playback device, the feedback message comprising an indication of whether execution of the configuration instructions was successful, and in response to receiving the feedback message, updating at least one of the plurality of correlations between display device identification data and corresponding configuration instructions based on the indication of whether execution of the configuration instructions was successful.

V. Conclusion

The above discussions relating to playback devices, controller devices, playback zone configurations, and media content sources provide only some examples of operating environments within which functions and methods described below may be implemented. Other operating environments and configurations of media playback systems, playback devices, audio sources, display devices, and other network devices not explicitly described herein may also be applicable and suitable for implementation of the configuration functions and methods disclosed herein.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

What is claimed is:

1. A sound-bar audio playback device comprising:
   one or more audio transducers;
   an audio input interface;
   one or more processors;
   one or more network interfaces;
   tangible, non-transitory computer-readable memory having instructions encoded therein, wherein the instructions, when executed by the one or more processors, cause the sound-bar audio playback device to perform a method comprising:
   receiving, via the audio input interface, data from a display device connected to the sound-bar audio playback device;
   sending, via at least one of the one or more network interfaces, a request for configuration instructions to a cloud computing system, wherein the request comprises the data received from the display device;
   in response to sending the data received from the display device to the cloud computing system, receiving, from the cloud computing system, configuration instructions from the cloud computing system, wherein the configuration instructions for the display device connected to the sound-bar audio playback device;
   providing the configuration instructions, wherein providing the configuration instructions comprises at least one of: (a) sending one or more commands to configure the display device to operate with the sound-bar audio playback device according to the configuration instructions or (b) causing display of the configuration instructions, wherein the sound-bar audio playback device is operable to (a) send the one or more commands to configure the display device to operate with the soundbar audio playback device according to the configuration instructions and (b) cause display of the configuration instructions; and after the display device is configured to operate with the sound-bar audio playback device, receiving, via the audio input interface, at least an audio portion of an A/V signal; and playing back the audio portion of the A/V signal via the one or more audio transducers while the display device plays back a video portion of the A/V signal.

2. The sound-bar audio playback device of claim 1, wherein the audio input interface comprises a High-Definition Multimedia Interface (HDMI) input, wherein receiving data from the display device connected to the sound-bar audio playback device comprises receiving data from the display device via a HDMI connection between the display device and the sound-bar audio playback device, and wherein receiving at least the audio portion of the A/V signal comprises receiving data representing an HDMI audio return channel signal.

3. The sound-bar audio playback device of claim 1, wherein receiving data from the display device connected to the sound-bar audio playback device comprises receiving Extended Display Data (EDID) from the display device.

4. The sound-bar audio playback device of claim 1, wherein receiving configuration instructions from the cloud computing system comprises receiving instructions for configuring at least one High-Definition Multimedia Interface (HDMI) Consumer Electronics Control (CEC) feature on one or both of the sound-bar audio playback device and the display device.

5. The sound-bar audio playback device of claim 1, wherein receiving configuration instructions from the cloud computing system comprises receiving instructions for configuring one or more of (i) at least one voice control feature on one or both of the sound-bar audio playback device and the display device, (ii) at least one control signaling feature on one or both of the sound-bar audio playback device and the display device, and (iii) at least one audio feature on one or both of the sound-bar audio playback device and the display device.

6. The sound-bar audio playback device of claim 1, wherein receiving configuration instructions from the cloud computing system comprises receiving instructions for troubleshooting one or more configuration settings for one or both of the sound-bar audio playback device and the display device.

7. The sound-bar audio playback device of claim 1, wherein causing display of the configuration instructions comprises sending at least a portion of the configuration instructions to a controller device via one of the one or more network interfaces, wherein the controller device is separate from the sound-bar audio playback device, wherein the controller device comprises a wireless mobile device.

8. The sound-bar audio playback device of claim 1, wherein causing display of the configuration instructions comprises sending, to the display device, a video signal that causes display of at least a portion of the configuration instructions on the display device.

9. The sound-bar audio playback device of claim 1, wherein the method further comprises:

in response to receiving configuration instructions from the cloud computing system, configuring at least one setting of the sound-bar audio playback device according to the configuration instructions.

10. The sound-bar audio playback device of claim 1, wherein the sound-bar audio playback device is in a synchrony with at least one other audio playback device, and wherein the method further comprises:

in response to receiving configuration instructions from the cloud computing system, (i) configuring at least one setting of the sound-bar audio playback device according to the configuration instructions, and (ii) configuring at least one setting of the at least one other audio playback device according to the configuration instructions.

11. The sound-bar audio playback device of claim 1, wherein the method further comprises:

in response to receiving configuration instructions from the cloud computing system, configuring at least one setting of the display device according to the configuration instructions.

12. The sound-bar audio playback device of claim 1, wherein the method further comprises:

receiving feedback on whether execution of the configuration instructions was successful; and in response to receiving the feedback, transmitting a feedback message to the cloud computing server comprising an indication of the feedback.

13. A cloud computing system comprising:

one or more processors;

one or more network interfaces;

tangible, non-transitory computer-readable memory having instructions encoded therein, wherein the instructions, when executed by the one or more processors, cause the cloud computing system to perform a method comprising:

storing a plurality of correlations between display device identification data and corresponding configuration instructions in the tangible, non-transitory computer-readable media;

receiving a request for configuration instructions from a sound-bar audio playback device, wherein the request comprises data that the sound-bar audio playback device received from a display device;

in response to receiving the request for configuration instructions from the sound-bar audio playback device, determining whether the plurality of correlations includes configuration instructions corresponding to the data in the request; and in response to determining that the plurality of correlations includes configuration instructions corresponding to the data in the request, transmitting the configuration instructions corresponding to the data in the request to the sound-bar audio playback device that sent the request, wherein the sound-bar audio playback device is configured to provide the configuration instructions, wherein providing the configuration instructions comprises at least one of: (a) sending one or more commands to configure the display device to operate with the sound-bar audio playback device according to the configuration instructions or (b) causing display of the configuration instructions, and wherein the sound-bar audio playback device is operable to (a) send the one or more commands to configure the display device to operate with the sound-bar audio playback device according to the configuration instructions and (b) cause display of the configuration instructions.

14. The cloud computing system of claim 13, wherein the request received from the sound-bar audio playback device comprises Extended Display Data (EDID) that the sound-bar audio playback device received from the display device.

15. The cloud computing system of claim 13, wherein the configuration instructions comprise instructions for configuring at least one High-Definition Multimedia Interface (HDMI) Consumer Electronics Control (CEC) feature on one or both of the sound-bar audio playback device and the display device.

16. The cloud computing system of claim 13, wherein the configuration instructions comprise instructions for configuring one or more of (i) at least one voice control feature on one or both of the sound-bar audio playback device and the display device, (ii) at least one control signaling feature on one or both of the sound-bar audio playback device and the display device, and (iii) at least one audio feature on one or both of the sound-bar audio playback device and the display device.

17. The cloud computing system of claim 13, wherein transmitting the configuration instructions corresponding to the data in the request to the sound-bar audio playback device that sent the request comprises configuring the sound-bar audio playback device according to the configuration instructions.

18. The cloud computing system of claim 13, wherein the sound-bar audio playback device is in a synchrony group with at least one other audio playback device, and wherein transmitting the configuration instructions corresponding to the data in the request to the sound-bar audio playback device that sent the request comprises (i) configuring the sound-bar audio playback device according to the configuration instructions, and (ii) configuring the at least one other audio playback device according to the configuration instructions.

19. The cloud computing system of claim 13, wherein the method further comprises:
  receiving a feedback message from the sound-bar audio playback device, the feedback message comprising an indication of whether execution of the configuration instructions was successful; and
  in response to receiving the feedback message, updating at least one of the plurality of correlations between display device identification data and corresponding configuration instructions based on the indication of whether execution of the configuration instructions was successful.

20. A method to be performed by a sound-bar audio playback device, the method comprising:
  receiving, via an audio input interface, data from a display device connected to the sound-bar audio playback device;
  sending, via at least one or more network interface, a request for configuration instructions to a cloud computing system, wherein the request comprises the data received from the display device;
  in response to sending the data received from the display device to the cloud computing system, receiving, from the cloud computing system, configuration instructions from the cloud computing system, wherein the configuration instructions for the display device connected to the sound-bar audio playback device;
  providing the configuration instructions, wherein providing the configuration instructions comprises at least one of: (a) sending one or more commands to configure the display device to operate with the sound-bar audio playback device according to the configuration instructions or (b) causing display of the configuration instructions, wherein the sound-bar audio playback device is operable to (a) send the one or more commands to configure the display device to operate with the sound-bar audio playback device according to the configuration instructions and (b) cause display of the configuration instructions; and
  after the display device is configured to operate with the sound-bar audio playback device, receiving, via the audio input interface, at least an audio portion of an A/V signal; and
  playing back the audio portion of the A/V signal via one or more audio transducers while the display device plays back a video portion of the A/V signal.

* * * * *